(12) United States Patent
Ahn et al.

(10) Patent No.: US 10,852,891 B2
(45) Date of Patent: Dec. 1, 2020

(54) ULTRA-THIN TOUCH PANEL AND METHOD OF FABRICATING THE SAME

(71) Applicant: INDUSTRY-ACADEMIC COOPERATION FOUNDATION, YONSEI UNIVERSITY, Seoul (KR)

(72) Inventors: Jong Hyun Ahn, Seoul (KR); Minpyo Kang, Seongnam-si (KR)

(73) Assignee: INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 0 days.

(21) Appl. No.: 16/122,962

(22) Filed: Sep. 6, 2018

(65) Prior Publication Data

US 2019/0073057 A1 Mar. 7, 2019

(30) Foreign Application Priority Data

Sep. 7, 2017 (KR) .................. 10-2017-0114406

(51) Int. Cl.
*G06F 3/044* (2006.01)
*G06F 3/041* (2006.01)
*G06F 3/0488* (2013.01)

(52) U.S. Cl.
CPC ............ *G06F 3/044* (2013.01); *G06F 3/0412* (2013.01); *G06F 3/04883* (2013.01); *G06F 2203/04102* (2013.01); *G06F 2203/04103* (2013.01); *G06F 2203/04104* (2013.01); *G06F 2203/04107* (2013.01); *G06F 2203/04111* (2013.01); *G06F 2203/04112* (2013.01)

(58) Field of Classification Search
CPC ..... G06F 3/044; G06F 3/0412; G06F 3/04883
See application file for complete search history.

(56) References Cited

U.S. PATENT DOCUMENTS

| 2013/0127480 A1* | 5/2013 | Cuseo | G06F 3/044 324/686 |
| 2013/0313006 A1* | 11/2013 | Ahn | H05K 1/097 174/257 |
| 2016/0320879 A1* | 11/2016 | Hashida | G06F 3/044 |

FOREIGN PATENT DOCUMENTS

| KR | 10-2012-0067031 A | 6/2012 |
| KR | 10-1458919 B1 | 11/2014 |

(Continued)

OTHER PUBLICATIONS

Office Action dated Jun. 21, 2018, issued by the Korean Patent Office in counterpart Korean Patent Application No. 10-2017-0114406.

*Primary Examiner* — Alexander Eisen
*Assistant Examiner* — Cory A Almeida
(74) *Attorney, Agent, or Firm* — Sughrue Mion, PLLC

(57) ABSTRACT

Disclosed are an ultra-thin touch panel and a method of fabricating the same. Particularly, the ultra-thin touch panel according to an embodiment of the present disclosure includes a flexible substrate, a plurality of first sensing electrodes arranged in a first direction on the flexible substrate, an adhesive insulating layer formed on the flexible substrate and the first sensing electrodes, and a plurality of second sensing electrodes arranged in a second direction, which intersects the first direction, on the flexible substrate and the adhesive insulating layer using a wet transfer method, wherein the flexible substrate is patterned in a shape corresponding to the first and second sensing electrodes by oxygen plasma etching to form a polygonal mesh structure.

12 Claims, 41 Drawing Sheets

(56) References Cited

FOREIGN PATENT DOCUMENTS

| KR | 10-2016-0086484 A | 7/2016 |
|----|-------------------|--------|
| KR | 10-1749861 B1 | 6/2017 |

\* cited by examiner

ULTRA-THIN TOUCH PANEL AND METHOD OF FABRICATING THE SAME

CROSS-REFERENCE TO RELATED APPLICATION

This application claims the priority benefit of Korean Patent Application No. 10-2017-0114406, filed on Sep. 7, 2017 in the Korean Intellectual Property Office, the disclosure of which is incorporated herein by reference.

BACKGROUND OF THE DISCLOSURE

Field of the Disclosure

The present disclosure relates to a technical idea for fabricating an ultra-thin touch panel, and more particularly, to an ultra-thin touch panel fabricated using large-area graphene, grown by chemical vapor deposition, as an electrode material and a method of fabricating the ultra-thin touch panel.

Description of the Related Art

A touch panel is an input device mounted on a surface of a display device to convert a physical contact of a user's finger or the like into an electrical signal and thus to operate the product. A touch panel can be widely applied to various display devices. In recent years, demand therefor is increasing.

Such a touch panel can be classified into a resistive type, a capacitive type, a surface acoustic wave (SAW) type, and an infrared (IR) type, and the like according to the operation principle thereof.

Thereamong, a capacitive touch panel converts a contact position into an electrical signal by sensing a change in the capacitance that a conductive sensing electrode forms with other surrounding sensing electrodes or ground electrodes when a human hand or an object touches the same.

In recent years, flexible display devices and wearable devices have been developed, and a touch panel mounted on these devices is required to have flexibility. In particular, a wearable device is required to have stretchability along with flexibility so as to be attached to a curved body.

In existing touch panels, sensing electrodes are generally realized using a transparent conductive material such as indium tin oxide (ITO). When a flexible touch panel is bent or folded, cracks occur on a sensing electrode and thus a product is damaged, thereby causing a malfunction.

In addition, since ITO is not suitable for a high-temperature process, there is a need for a flexible and stretchable touch panel that can be applied to flexible display devices and wearable devices without use of a sensing electrode using ITO.

Korean Patent No. 10-1749861, as one of technologies related to the present disclosure, discloses a touch panel including a plurality of first sensing electrodes patterned on a first flexible substrate, a plurality of second sensing electrodes patterned on a second flexible substrate, and an adhesive insulating layer patterned between the first sensing electrodes and the second sensing electrodes to form a capacitor between the first sensing electrodes and the second sensing electrodes, and a method of fabricating the touch panel.

However, since a touch panel fabricated according to existing technology requires two flexible substrates and thus is fabricated in a 2-glass manner, a fabricated display device disadvantageously becomes relatively thick and hard.

Therefore, there is a need for a method of fabricating a touch panel in a 1-glass manner to increase flexibility while reducing the thickness of a display device.

RELATED ART DOCUMENTS

Patent Documents

Korean Patent Application Publication No. 10-2012-0067031, entitled "TOUCH SCREEN-INTEGRATED FLAT DISPLAY DEVICE"

Korean Patent No. 10-1458919, entitled "METHOD OF FORMING CONDUCTIVE PATTERN OF TOUCH SCREEN PANEL"

Korean Patent No. 10-1749861, entitled "TOUCH PANEL AND METHOD OF FABRICATING THE SAME"

SUMMARY OF THE DISCLOSURE

Therefore, the present disclosure has been made in view of the above problems, and it is one object of the present disclosure to provide an ultra-thin touch panel having increased flexibility and stretchability by forming sensing electrodes with a substitute for ITO between flexible substrates, and a method of fabricating the same.

It is another object of the present disclosure to provide an ultra-thin touch panel having increased flexibility and stretchability by forming a flexible substrate to have a polygonal mesh structure using an oxygen plasma etching method, and a method of fabricating the same.

It is yet another object of the present disclosure to provide an ultra-thin touch panel having a 1-glass type mesh structure by forming all first and second sensing electrodes, which constitute a capacitor, on one flexible substrate, and a method of fabricating the same.

In accordance with an aspect of the present disclosure, the above and other objects can be accomplished by the provision of an ultra-thin touch panel including a flexible substrate; a plurality of first sensing electrodes arranged in a first direction on the flexible substrate; an adhesive insulating layer formed on the flexible substrate and the first sensing electrodes; and a plurality of second sensing electrodes arranged in a second direction, which intersects the first direction, on the flexible substrate and the adhesive insulating layer using a wet transfer method, wherein the flexible substrate is patterned in a shape corresponding to the first and second sensing electrodes by oxygen plasma etching to form a polygonal mesh structure.

According to an embodiment of the present disclosure, the polygonal mesh structure may be any one of a tetragonal mesh structure, a hexagonal mesh structure, and an auxetic mesh structure.

According to an embodiment of the present disclosure, the first sensing electrodes may be formed to have a concave and convex pattern inclined in a forward or reverse direction and the second sensing electrodes may be formed in a zigzag pattern of passing the concave and convex pattern of the first sensing electrodes to form a hexagonal mesh structure or auxetic mesh structure along with the first sensing electrodes.

According to an embodiment of the present disclosure, the first and second sensing electrodes may be formed of any one of graphene, a carbon nanotube, a metal wire, and a metal mesh.

According to an embodiment of the present disclosure, the flexible substrate may be formed of any one of polyethylene terephthalate (PET), polycarbonate (PC), polyethersulfone (PES), polyimide (PI), polymethylmethacrylate (PMMA), and a cyclo-olefin polymer (COP).

According to an embodiment of the present disclosure, the adhesive insulating layer may be located between the first sensing electrodes and the second sensing electrodes and has a mesh structure the same as the flexible substrate.

According to an embodiment of the present disclosure, the adhesive insulating layer may be formed of any one of an optically clean resin (OCR), an optically clean adhesive (OCA), and SU-8.

The ultra-thin touch panel according to an embodiment of the present disclosure may further include a ground shielding layer formed on a lower surface of the flexible substrate and formed of any one of graphene, a carbon nanotube, a metal wire, and a metal mesh.

In accordance with another aspect of the present disclosure, there is provided an ultra-thin touch panel including a flexible substrate; a plurality of first sensing electrodes arranged in a first direction on the flexible substrate; an adhesive insulating layer formed on the flexible substrate and the first sensing electrodes; a plurality of second sensing electrodes arranged in a second direction, which intersects the first direction, on the flexible substrate; and a metal bridge layer formed on the flexible substrate, the adhesive insulating layer, and the second sensing electrodes, wherein the flexible substrate is patterned in a shape corresponding to the first and second sensing electrodes by oxygen plasma etching to form a polygonal mesh structure.

In accordance with another aspect of the present disclosure, there is provided a method of fabricating an ultra-thin touch panel, the method including forming a flexible substrate on a metal substrate; forming a plurality of first sensing electrodes, which is arranged in a first direction, on the flexible substrate; forming an adhesive insulating layer on the flexible substrate and the first sensing electrodes; forming a plurality of second sensing electrodes arranged in a second direction, which intersects the first direction, on the flexible substrate and the adhesive insulating layer using a wet transfer method; and oxygen-plasma-etching the flexible substrate to be patterned into a polygonal mesh structure corresponding to the first sensing electrodes and the second sensing electrodes by oxygen plasma etching.

According to an embodiment of the present disclosure, the forming of the second sensing electrodes may include patterning the second sensing electrodes in the second direction after wet-transferring the second sensing electrodes onto the adhesive insulating layer.

In accordance with yet another aspect of the present disclosure, there is provided a method of fabricating an ultra-thin touch panel, the method including forming a flexible substrate on a metal substrate; forming a plurality of first sensing electrodes, which is arranged in a first direction, on the flexible substrate; forming an adhesive insulating layer on the flexible substrate and the first sensing electrodes; forming a plurality of second sensing electrodes in a second direction, which interests the first direction, on the flexible substrate to be spaced from the adhesive insulating layer; forming a metal bridge layer on the flexible substrate, the adhesive insulating layer, and the second sensing electrodes; and oxygen-plasma-etching the flexible substrate to be patterned into a polygonal mesh structure corresponding to the first sensing electrodes and the second sensing electrodes by oxygen plasma etching.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF THE DISCLOSURE

Figure 1A:
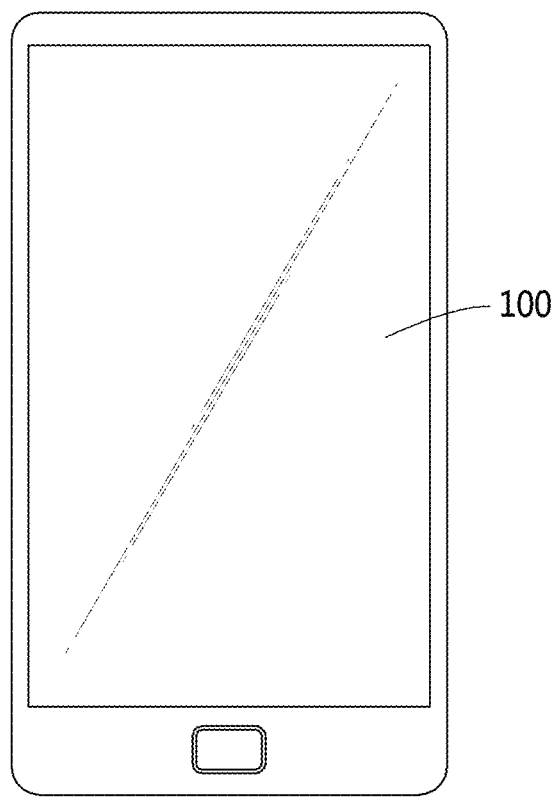
FIG. 1A illustrates a flexible display device to which an ultra-thin touch panel according to an embodiment of the present disclosure is applied.

The present disclosure will now be described more fully with reference to the accompanying drawings, in which exemplary embodiments of the disclosure are shown.

This disclosure, however, should not be construed as limited to the exemplary embodiments and terms used in the exemplary embodiments, and should be understood as including various modifications, equivalents, and substituents of the exemplary embodiments.

Preferred embodiments of the present disclosure are now described more fully with reference to the accompanying drawings. In the description of embodiments of the present disclosure, certain detailed explanations of related known functions or constructions are omitted when it is deemed that they may unnecessarily obscure the essence of the disclosure.

In addition, the terms used in the specification are defined in consideration of functions used in the present disclosure, and can be changed according to the intent or conventionally used methods of clients, operators, and users.

Accordingly, definitions of the terms should be in the drawings, like reference numerals in the drawings denote like elements.

As used herein, the singular forms "a," "an" and "the" are intended to include the plural forms as well, unless context clearly indicates otherwise.

Expressions such as "A or B" and "at least one of A and/or B" should be understood to include all possible combinations of listed items.

Expressions such as "a first," "the first," "a second" and "the second" may qualify corresponding components irrespective of order or importance and may be only used to distinguish one component from another component without being limited to the corresponding components.

In the case in which a (e.g., first) component is referred as "(functionally or communicatively) connected" or "attached" to another (e.g., second) component, the first component may be directly connected to the second component or may be connected to the second component via another component (e.g., third component).

In the specification, the expression " . . . conFIGURE.d to . . . (or set to)" may be used interchangeably, for example, with expressions, such as " . . . suitable for . . . ," " . . . having ability to . . . ," " . . . modified to . . . ," " . . . manufactured to . . . ," " . . . enabling to . . . ," or " . . . designed to . . . ," in the case of hardware or software depending upon situations.

In any situation, the expression "an apparatus conFIGURE.d to . . . " may refer to an apparatus conFIGURE.d to operate "with another apparatus or component."

For examples, the expression "a processor conFIGURE.d (or set) to execute A, B, and C" may refer to a specific processor performing a corresponding operation (e.g., embedded processor), or a general-purpose processor (e.g., CPU or application processor) executing one or more software programs stored in a memory device to perform corresponding operations.

In addition, the expression "or" means "inclusive or" rather than "exclusive or".

That is, unless otherwise mentioned or clearly inferred from context, the expression "x uses a or b" means any one of natural inclusive permutations.

FIG. 1A illustrates a flexible display device to which an ultra-thin touch panel according to an embodiment of the present disclosure is applied.

Referring to FIG. 1A, a flexible display device 1000 includes an ultra-thin touch panel 100 integrated therewith.

The ultra-thin touch panel 100 may include a plurality of first sensing electrodes and a plurality of second sensing electrodes intersecting each other, and may sense a touch position of an object using changes in capacitance generated from the sensing electrodes.

For example, the ultra-thin touch panel 100 may include a capacitance sensing circuit for sensing changes in capacitance; and a controller integrated circuit including an analog-to-digital conversion circuit for converting an output signal of a capacitance sensing circuit into a digital value, an arithmetic circuit for determining touch input using data that has been converted into a digital value, and the like.

Since the ultra-thin touch panel 100 according to an embodiment of the present disclosure is flexible and stretchable, the sensing electrodes included therein may operate without being damaged even when bent or folded by external pressure upon being applied to the flexible display device 1000.

Figure 1B:
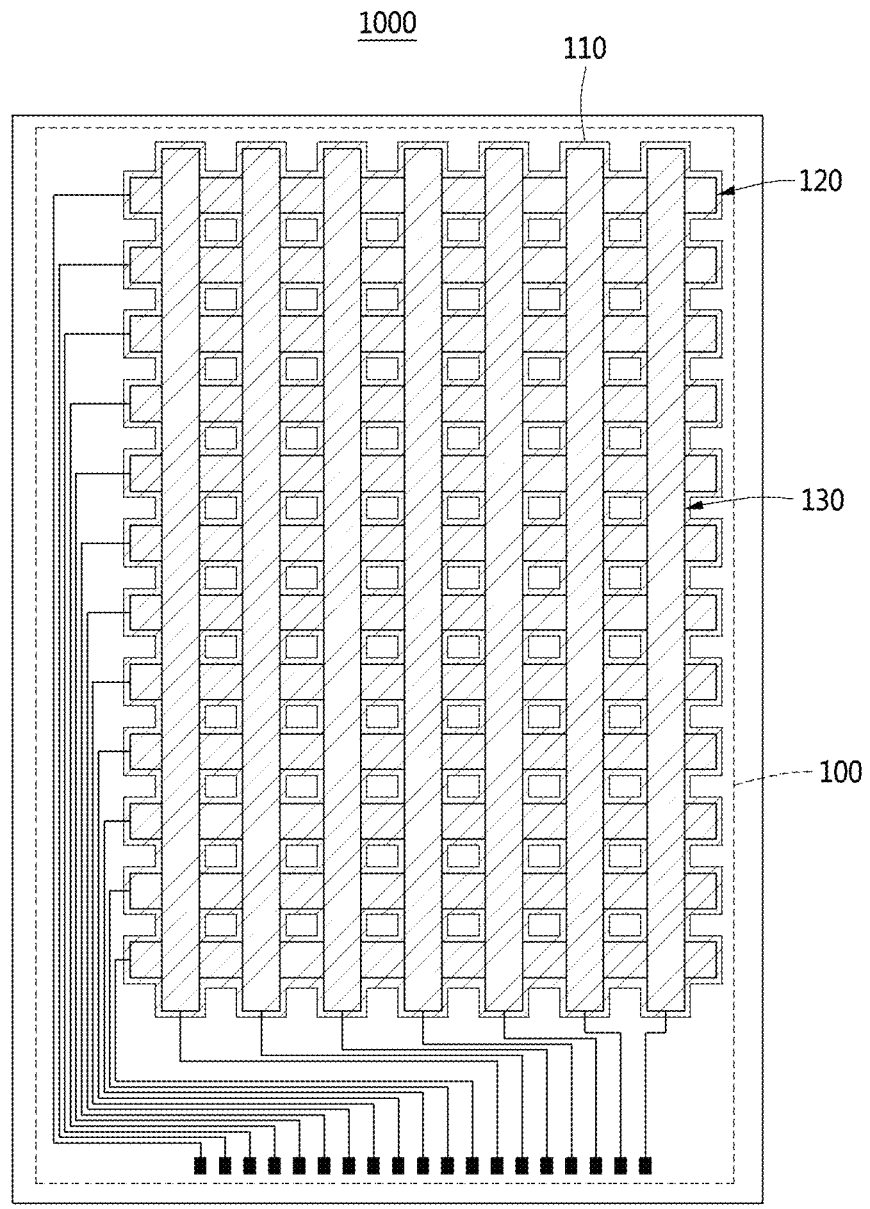
FIG. 1B illustrates a plan view of an ultra-thin touch panel according to an embodiment of the present disclosure.

FIG. 1B illustrates a plan view of an ultra-thin touch panel according to an embodiment of the present disclosure.

Referring to FIG. 1B, the ultra-thin touch panel 100 includes a flexible substrate 110, a plurality of first sensing electrodes 120, and a plurality of second sensing electrodes 130.

The flexible substrate 110 is bonded to the first and second sensing electrodes 120 and 130 to support the first and second sensing electrodes 120 and 130.

For example, the flexible substrate 110 may have a polygonal mesh structure wherein first-direction rows and second-direction columns intersect each other.

According to an embodiment of the present disclosure, the flexible substrate 110 has a tetragonal mesh structure.

For example, the first sensing electrodes 120 may be located on the flexible substrate 110 and may be bonded to an area of the first-direction rows.

According to an embodiment of the present disclosure, the second sensing electrodes 130 may be located on the flexible substrate 110 and may be bonded to the second-direction columns.

According to an embodiment of the present disclosure, the first and second sensing electrodes 120 and 130 form a capacitor and, when touched with an object (e.g., a human finger), the first and second sensing electrodes 120 and 130 may sense the position (coordinates) of a point where capacitance is changed.

Meanwhile, the first and second sensing electrodes 120 and 130 are formed of graphene. Graphene, which is a transparent electrode material, has high charge mobility (~200,000 $cm^2/V \cdot s$) and thermal conductivity (~5,000 W/mK) and excellent chemical resistance.

In addition, graphene uniformly absorbs light in the entire wavelength area due to exclusion of bandgaps and has a thickness corresponding to a single layer of carbon atoms, which results in a transparency of about 97.7%. In addition, graphene has superior electrical conductivity, excellent mechanical strength (Young's modulus ~1.0 TPa), and high flexibility (ε~25%), thereby being applicable as a material of a transparent electrode.

In particular, graphene may be fabricated in a thin film shape and thus is flexible and stretchable. Accordingly, graphene is not affected by electrical characteristics even if it is deformed, thereby being used as a sensing electrode applicable to the flexible display device 1000.

In addition, the first and second sensing electrodes 120 and 130 may be formed of a carbon nanotube (CNT), a metal wire, or a metal mesh.

CNT is a new material having a hexagonal ring-shaped carbon structure like a honeycomb, possesses 100 times higher rigidity than steel and 1,000 times higher conductivity than copper, and has stable conductivity.

In addition, a metal mesh is manufactured by printing silver or copper to a thickness of 2 to 6 μm in the form of a grid. Since the metal mesh is formed of a metal having high conductivity, it has low resistance and thus is applicable to large touch panels.

The aforementioned graphene, carbon nanotubes, a metal wire, a metal mesh, and the like have high conductivity and are flexible, thereby being used as an electrode material to substitute for indium tin oxide (ITO).

Although not shown in the drawings, an adhesive insulating layer is disposed between the first sensing electrodes 120 and the second sensing electrodes 130.

The adhesive insulating layer may be formed of a material capable of bonding the first and second sensing electrodes 120 and 130 to each other and insulating the same. Particularly, the adhesive insulating layer may be formed of an optically clean resin (OCR), an optically clean adhesive (OCA), or SU-8.

Meanwhile, the flexible substrate 110 may be a film formed of polyethylene terephthalate (PET), polycarbonate (PC), polyethersulfone (PES), polyimide (PI), polymethylmethacrylate (PMMA), a cyclo-olefin polymer (COP), or the like, and may be formed of a flexible material. The flexible substrate 110 has a flexible characteristic due to the properties of the material.

The flexible substrate 110 has a tetragonal mesh structure formed by patterning regions between the first sensing electrodes 120 and the second sensing electrodes 130 by oxygen plasma etching.

In addition, the adhesive insulating layer is patterned along with the flexible substrate 110, thereby having the same tetragonal mesh structure as the flexible substrate 110. Due to the tetragonal mesh structure, square holes are present between rows and columns. Due to the holes, the stretchability of the touch panel 100 increases.

As described above, by forming the first and second sensing electrodes 120 and 130, formed of graphene, carbon nanotube, a metal wire, a metal mesh, or the like, in the flexible substrate 110 having a tetragonal mesh structure, the touch panel 100 becomes flexible and stretchable, thereby being applicable to the flexible display device 1000 or a wearable device.

For example, the polygonal mesh structure may include any one of a tetragonal mesh structure, a hexagonal mesh structure, and an auxetic mesh structure.

FIGS. 2A to 2E illustrate a method of fabricating an ultra-thin touch panel according to an embodiment of the present disclosure.

In particular, FIGS. 2A to 2E illustrate front plan views of an ultra-thin touch panel fabricated according to a method of fabricating an ultra-thin touch panel.

Figure 2A:
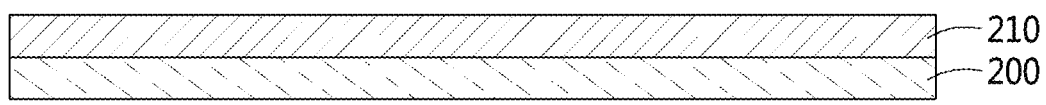
FIGS. 2A to 2E illustrate a method of fabricating an ultra-thin touch panel according to an embodiment of the present disclosure.

Referring to FIG. 2A, a flexible substrate 210 is formed on a metal substrate 200. The metal substrate 200 may include a copper (Cu) substrate and the like.

For example, the method of fabricating an ultra-thin touch panel is characterized by coating a film formed of polyethylene terephthalate (PET), polycarbonate (PC), polyethersulfone (PES), polyimide (PI), polymethylmethacrylate (PMMA), a cyclo-olefin polymer (COP), or the like on the metal substrate 200 to form the flexible substrate 210.

Figure 2B:
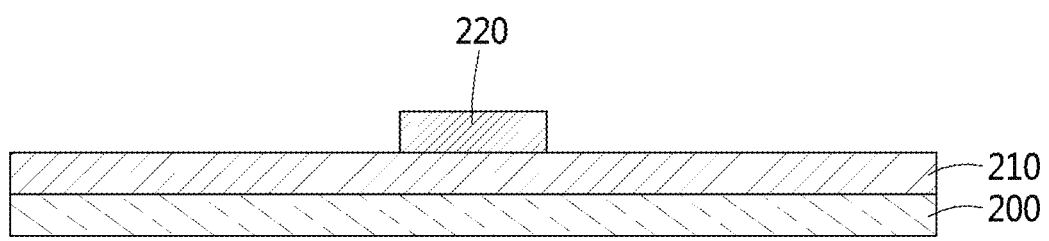

Referring to FIG. 2B, a plurality of first sensing electrodes 220 is formed on the flexible substrate 210.

For example, the method of fabricating an ultra-thin touch panel is characterized by transferring graphene onto the flexible substrate 210, and then pattering the same, thereby forming the first sensing electrodes 220 arranged in a first direction.

Here, graphene may be fabricated in a thin film shape to transfer the same onto the flexible substrate 210. A graphene film may be fabricated by a method of mechanically peeling high-quality graphite, a method of selectively sublimating silicon (Si) from a SiC wafer, a method of using chemical oxidation/reduction reaction of graphite, a chemical vapor deposition (CVD) method, or the like.

A graphene film fabricated by the method may be transferred onto the flexible substrate 210 using a roll-to-roll method, a wet transfer method, a dry transfer method, a polydimethylsiloxane (PDMD) transfer method, a direct transfer method, or the like.

Figure 2C:
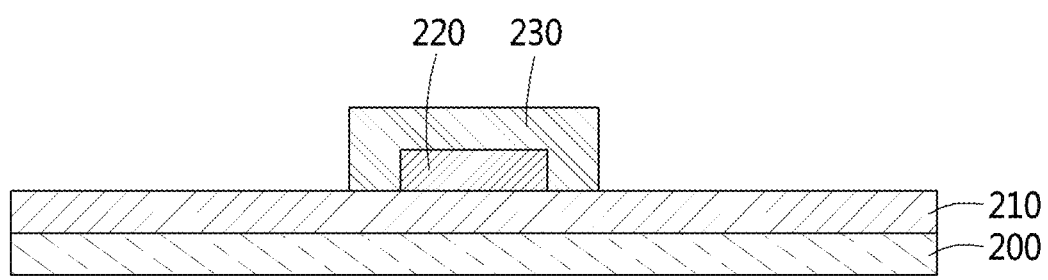

Referring to FIG. 2C, an adhesive insulating layer 230 is formed on the flexible substrate 210 and the first sensing electrodes 220.

According to an embodiment of the present disclosure, the method of fabricating an ultra-thin touch panel is characterized by coating an optically clean resin (OCR), an optically clean adhesive (OCA), or an SU-8 material on the flexible substrate 210 and the first sensing electrodes 220 to form the adhesive insulating layer 230.

For example, the adhesive insulating layer 230 may be provided for bonding of the first sensing electrodes 220, and a plurality of second sensing electrodes 240 to be formed in a subsequent process. For example, the adhesive insulating layer 230 may include a shielding layer for the first sensing electrodes 220 and may serve as a bridge of the first sensing electrodes 220 and the second sensing electrodes 240.

For example, the adhesive insulating layer 230 may separate the first sensing electrodes 220 and the second sensing electrodes 240 from each other.

Figure 2D:
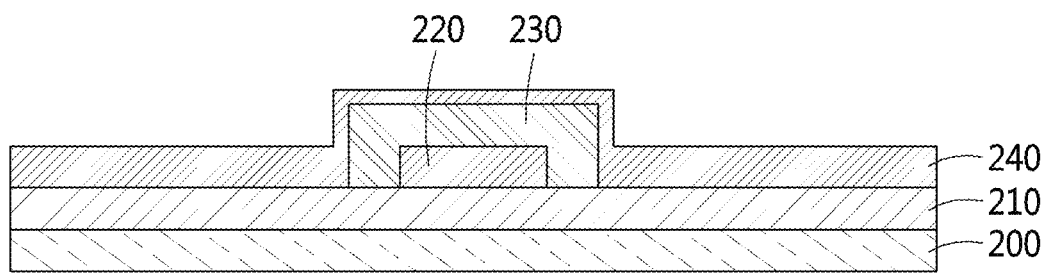

Referring to FIG. 2D, the second sensing electrodes 240 are arranged in a second direction, which intersects the first direction, on the flexible substrate 210 and the adhesive insulating layer 230.

For example, the method of fabricating an ultra-thin touch panel is characterized by transferring graphene onto the flexible substrate 210 and the adhesive insulating layer 230, and then patterning the same in the second direction to perpendicularly intersect the first sensing electrodes 220, thereby forming the second sensing electrodes 240.

For example, according to the method of fabricating an ultra-thin touch panel, the second sensing electrodes 240 may be transferred onto the flexible substrate 210 and the adhesive insulating layer 230 by a wet transfer method.

For example, according to the method of fabricating an ultra-thin touch panel, the first sensing electrodes 220 and the second sensing electrodes 240 may be formed on the flexible substrate 210 without an additional bridge by transferring the second sensing electrodes 240 onto the adhesive insulating layer 230.

Subsequently, according to the method of fabricating an ultra-thin touch panel, the flexible substrate 210 is subjected to oxygen plasma etching to be patterned in the same shape as the tetragonal mesh structure that is formed by perpendicularly intersecting the first sensing electrodes 220 with the second sensing electrodes 240. During the oxygen plasma etching, a photolithography process may be performed using a metal mask so as to form the tetragonal mesh structure. In this process, the adhesive insulating layer 230 is also patterned, whereby the adhesive insulating layer 230 may also have the tetragonal mesh structure.

When the flexible substrate 210 and the adhesive insulating layer 230 are etched at the same time using oxygen plasma as described above, a tetragonal mesh structure may be easily etched and a fabrication process may be simplified, compared to an existing mechanical cutting method.

Figure 2E:
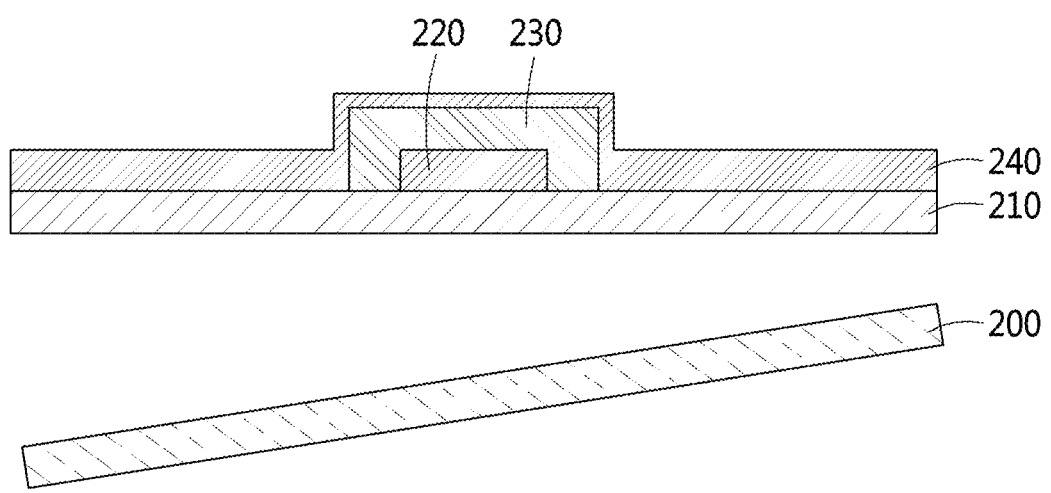

Referring to FIG. 2E, the metal substrate 200 is separated from the flexible substrate 210.

According to an embodiment of the present disclosure, the method of fabricating an ultra-thin touch panel is characterized by separating the metal substrate 200 from the flexible substrate 210 using ammonium persulfate (APS) for wet etching after completing etching of the flexible substrate 210, thereby fabricating an ultra-thin touch panel.

For example, stretchability of the flexible substrate 210, the first sensing electrodes 220, the adhesive insulating layer 230, and the second sensing electrodes 240 may increase because deformation due to bending is absorbed by the holes present between the rows and the columns of the tetragonal mesh structure.

According to an embodiment of the present disclosure, the method of fabricating an ultra-thin touch panel is characterized by forming a flexible substrate to have a polygonal mesh structure using an oxygen plasma etching method, thereby fabricating an ultra-thin touch panel having increased flexibility and stretchability.

In addition, according to an embodiment of the present disclosure, the method of fabricating an ultra-thin touch panel is characterized by forming all of the first and second sensing electrodes, which constitute a capacitor, on one flexible substrate, thereby fabricating an ultra-thin touch panel having a 1-glass type mesh structure.

FIGS. 3A to 3F illustrate a method of fabricating an ultra-thin touch panel according to an embodiment of the present disclosure.

In particular, FIGS. 3A to 3F illustrate front plan views of an ultra-thin touch panel fabricated according to a method of fabricating an ultra-thin touch panel.

Figure 3A:
FIGS. 3A to 3F illustrate a method of fabricating an ultra-thin touch panel according to an embodiment of the present disclosure.

Referring to FIG. 3A, a flexible substrate 310 is formed on a metal substrate 300.

For example, the method of fabricating an ultra-thin touch panel is characterized by coating a film formed of PET, PC, PES, PI, PMMA, COP, or the like on the metal substrate 300 to form the flexible substrate 310.

Figure 3B:
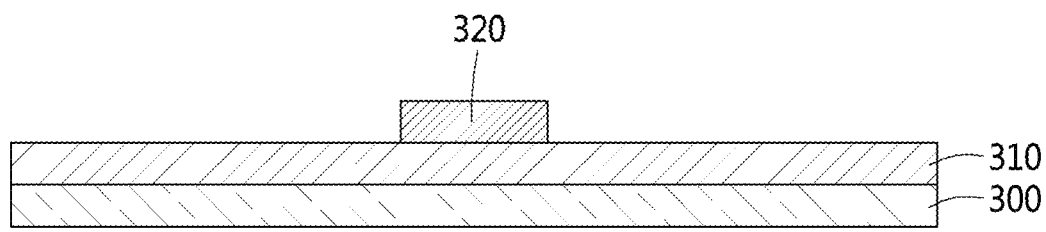

Referring to FIG. 3B, a plurality of first sensing electrodes 320 is formed on the flexible substrate 310.

For example, the method of fabricating an ultra-thin touch panel is characterized by transferring graphene onto the flexible substrate 310, and then pattering the same, thereby forming the first sensing electrodes 320 arranged in a first direction.

Here, graphene may be fabricated in a thin film shape to transfer the same onto the flexible substrate 310. A graphene film may be fabricated by a method of mechanically peeling high-quality graphite, a method of selectively sublimating silicon (Si) from a SiC wafer, a method of using chemical oxidation/reduction reaction of graphite, a chemical vapor deposition (CVD) method, or the like.

A graphene film fabricated by the method may be transferred onto the flexible substrate 310 in a roll-to-roll method, a wet transfer method, a dry transfer method, a polydimethylsiloxane (PDMD) transfer method, a direct transfer method, or the like.

Figure 3C:
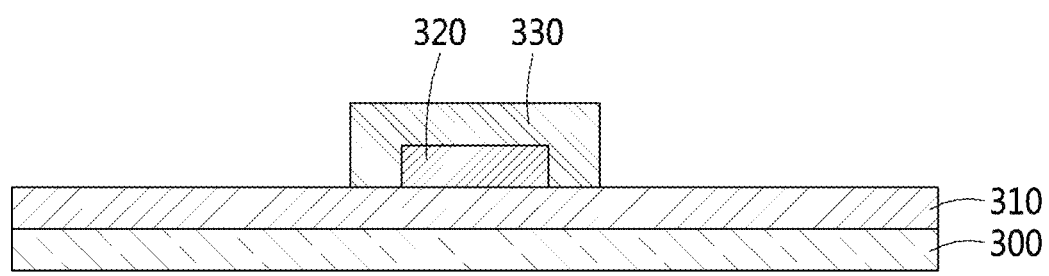

Referring to FIG. 3C, an adhesive insulating layer 330 is formed on the flexible substrate 310 and the first sensing electrodes 320.

According to an embodiment of the present disclosure, the method of fabricating an ultra-thin touch panel is characterized by spin-coating OCR, OCA, or an SU-8 material on the flexible substrate 310 and the first sensing electrodes 320 to form the adhesive insulating layer 330.

For example, the adhesive insulating layer 330 may be provided to separate the first sensing electrodes 320 from a plurality of second sensing electrodes 340 to be formed in a subsequent process while bonding the first sensing electrodes 320 to the second sensing electrodes 340. That is, the adhesive insulating layer 330 may serve as a bridge of the first sensing electrodes 320 and the second sensing electrodes 340.

Figure 3D:
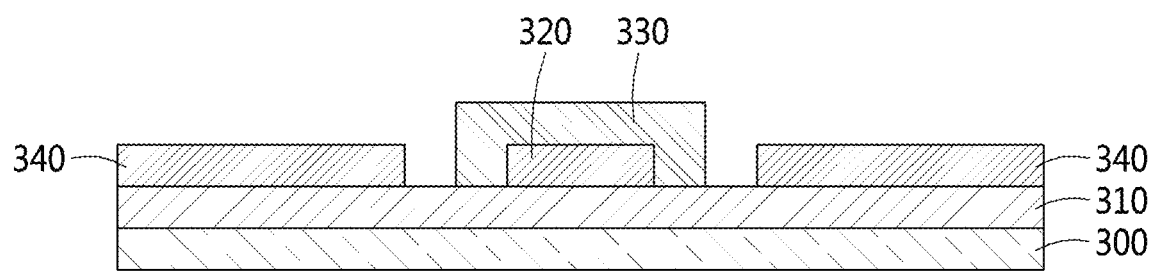

Referring to FIG. 3D, the second sensing electrodes 340 are arranged in a second direction, which intersects the first direction, on the flexible substrate 310.

For example, the method of fabricating an ultra-thin touch panel is characterized by transferring graphene onto the flexible substrate 310 and the adhesive insulating layer 330, and then patterning the same in the second direction to perpendicularly intersect the first sensing electrodes 320, thereby forming the second sensing electrodes 340.

For example, according to the method of fabricating an ultra-thin touch panel, the second sensing electrodes 340 may be transferred onto the flexible substrate 310 by a wet transfer method.

Figure 3E:
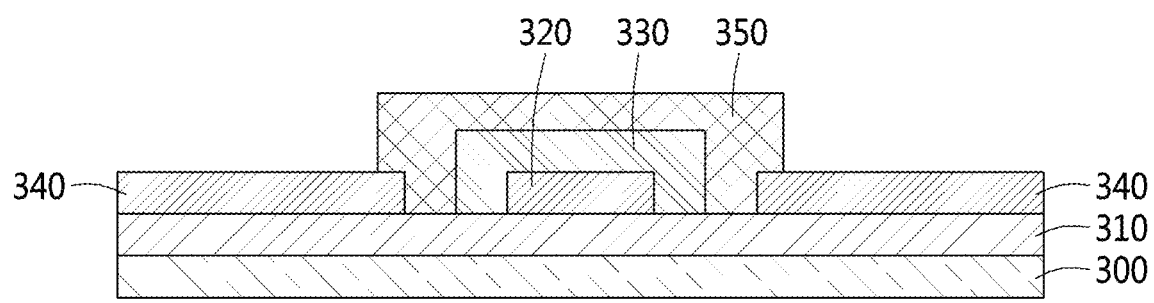

Referring to FIG. 3E, a metal bridge layer 350 is provided on the flexible substrate 310, the adhesive insulating layer 330, and the second sensing electrodes 340.

For example, according to the method of fabricating an ultra-thin touch panel, the metal bridge layer 350 is patterned on the flexible substrate 310, the adhesive insulating layer 330 and the second sensing electrodes 340.

Subsequently, according to the method of fabricating an ultra-thin touch panel, the flexible substrate 310 is subjected to oxygen plasma etching to be patterned in the same shape as the tetragonal mesh structure that is formed by perpendicularly intersecting the first sensing electrodes 320 with the second sensing electrodes 340. During the oxygen plasma etching, a photolithography process may be performed using a metal mask so as to form the tetragonal mesh structure.

In this process, the adhesive insulating layer 330 is also patterned, whereby the adhesive insulating layer 330 may also have the tetragonal mesh structure.

For example, a the metal bridge layer 350 may be formed of gold (Au) or the like, and may serve as a metal bridge between the adhesive insulating layer 330 and the second sensing electrodes 340.

Figure 3F:
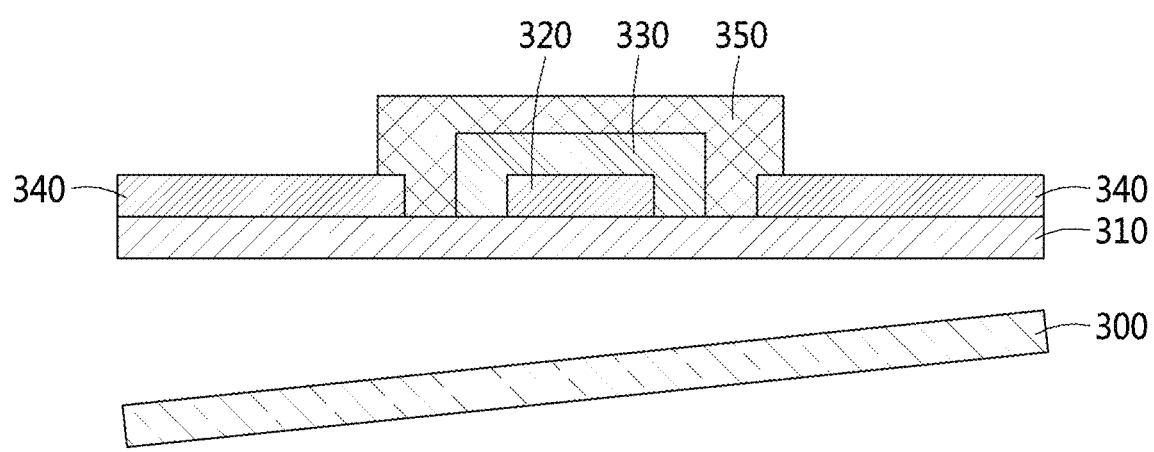

Referring to FIG. 3F, the metal substrate 300 is separated from the flexible substrate 310.

According to an embodiment of the present disclosure, the method of fabricating an ultra-thin touch panel is characterized by separating the metal substrate 300 from the flexible substrate 310 using ammonium persulfate (APS) for wet etching after completing etching of the flexible substrate 310, thereby fabricating an ultra-thin touch panel.

Figure 4:
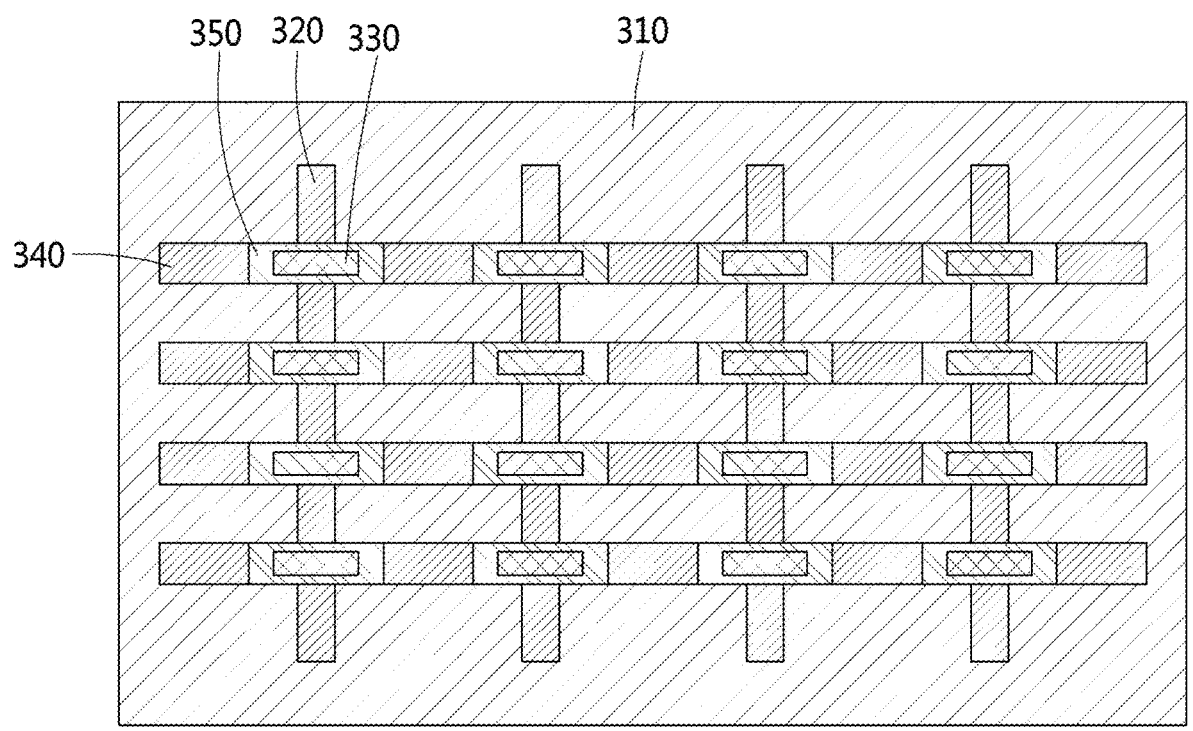
FIG. 4 illustrates a top plan view of an ultra-thin touch panel according to an embodiment of the present disclosure.

FIG. 4 illustrates a top plan view of an ultra-thin touch panel according to an embodiment of the present disclosure.

In particular, FIG. 4 illustrates a top plan view of an ultra-thin touch panel formed as shown in FIGS. 3A to 3F.

Referring to FIG. 4, the ultra-thin touch panel may be fabricated by forming the first sensing electrodes 320, the adhesive insulating layer 330, the second sensing electrodes 340, and the metal bridge layer 350 on the flexible substrate 310 in an order as shown in FIGS. 3A to 3F.

Figure 5:
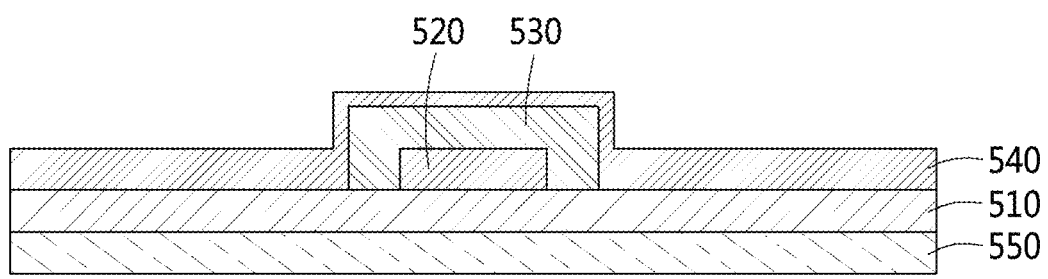
FIG. 5 illustrates a plan view of an ultra-thin touch panel according to an embodiment of the present disclosure.

FIG. 5 illustrates a plan view of an ultra-thin touch panel according to an embodiment of the present disclosure.

In particular, FIG. 5 illustrates a plan view of an ultra-thin touch panel according to an embodiment of the present disclosure which is applicable to a wearable device.

The ultra-thin touch panel includes a flexible substrate 510, a plurality of first sensing electrodes 520, an adhesive insulating layer 530, and a plurality of second sensing electrodes 540. A ground shielding layer 550 formed of graphene, carbon nanotube, a metal wire, a metal mesh, or the like is provided under the flexible substrate 510.

The ground shielding layer 550 may be fabricated in the same manner as shown in FIGS. 2A to 2E, and may be formed before forming the flexible substrate 510 on a metal substrate (not shown). That is, the ground shielding layer 550 and the flexible substrate 510 may be formed in this order on the metal substrate.

Alternatively, when an ultra-thin touch panel is fabricated according to the method shown in FIGS. 2A to 2E, the ground shielding layer 550 may be formed by transferring an electrode material onto a lower part of the flexible substrate 510.

When an ultra-thin touch panel is applied to a wearable device such as a watch attached to the wrist, interference may occur because it is in contact with or close to the skin.

To prevent this, the ground shielding layer 550 may be formed on a lower part of the flexible substrate 510.

When the touch panel according to the present disclosure is applied to a wearable device, interference may be shielded, and thus, stable operation may be accomplished. In addition, the touch panel may be easily attached to a curved body due to the flexibility and stretchability thereof.

Figure 6:
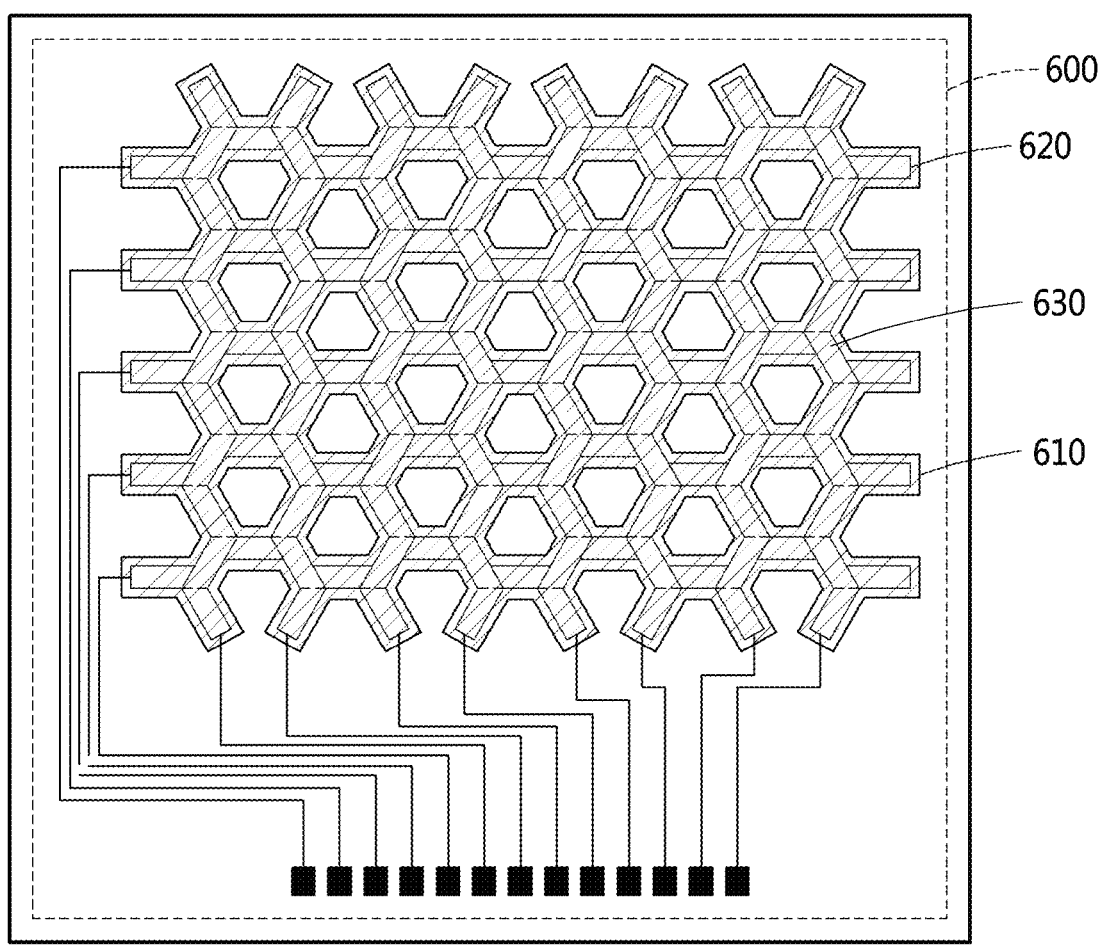
FIG. 6 illustrates a plan view of an ultra-thin touch panel including a flexible substrate having a hexagonal mesh structure according to an embodiment of the present disclosure.

FIG. 6 illustrates a plan view of an ultra-thin touch panel including a flexible substrate having a hexagonal mesh structure according to an embodiment of the present disclosure.

In particular, FIG. 6 illustrates a plan view of an ultra-thin touch panel according to another embodiment of the present disclosure. In particular, an ultra-thin touch panel including a flexible substrate that is etched along a structure corresponding to a plurality of first sensing electrodes and a plurality of second sensing electrodes to have a hexagonal mesh structure is illustrated.

Referring to FIG. 6, an ultra-thin touch panel 600 includes a flexible substrate 610, a plurality of first sensing electrodes 620, and a plurality of second sensing electrodes 630.

For example, the first sensing electrodes 620 are arranged in a first direction on the flexible substrate 610 and have a concave and convex pattern inclined in a forward direction. That is, a concave and convex pattern wherein a concave region and a convex region are repeated may be observed in plan view. In addition, the concave and convex pattern may have an inclined structure wherein the convex region is narrowed toward a forward or upward direction.

Meanwhile, the second sensing electrodes 630 are arranged in a second direction on the first sensing electrodes 620, thereby intersecting with the first sensing electrodes 620.

For example, the second sensing electrodes 630 may be formed in a zigzag pattern passing from a convex region of the first sensing electrodes 620 to an inclined region.

Accordingly, in plan view, the first and second sensing electrodes 620 and 630 may form a hexagonal mesh structure.

The first sensing electrodes 620 and the second sensing electrodes 630 may be formed of any one of graphene, a carbon nanotube, a metal wire, and a metal mesh.

In addition, although not shown in FIG. 6, an adhesive insulating layer is formed between the first sensing electrodes 620 and the second sensing electrodes 630.

Meanwhile, the flexible substrate 610 is patterned in a shape corresponding to the first and second sensing electrodes 620 and 630 by oxygen plasma etching, thereby forming a hexagonal mesh structure.

That is, the flexible substrate 610 may be fabricated into a hexagonal mesh structure, wherein hexagonal holes are present between rows and columns, by etching remaining regions except for a region where the first and second sensing electrodes 620 and 630 are located. In this process, the adhesive insulating layer is patterned along with the flexible substrate 610, thereby having the same mesh structure as the flexible substrate 610.

For example, the stretchability of the first and second sensing electrodes 620 and 630 may increase because deformation due to bending is absorbed by concave polygonal holes between rows and columns of the hexagonal mesh structure.

Accordingly, the first sensing electrodes 620 and the second sensing electrodes 630 may operate without being damaged despite being bent or folded by external pressure.

Figure 7A:
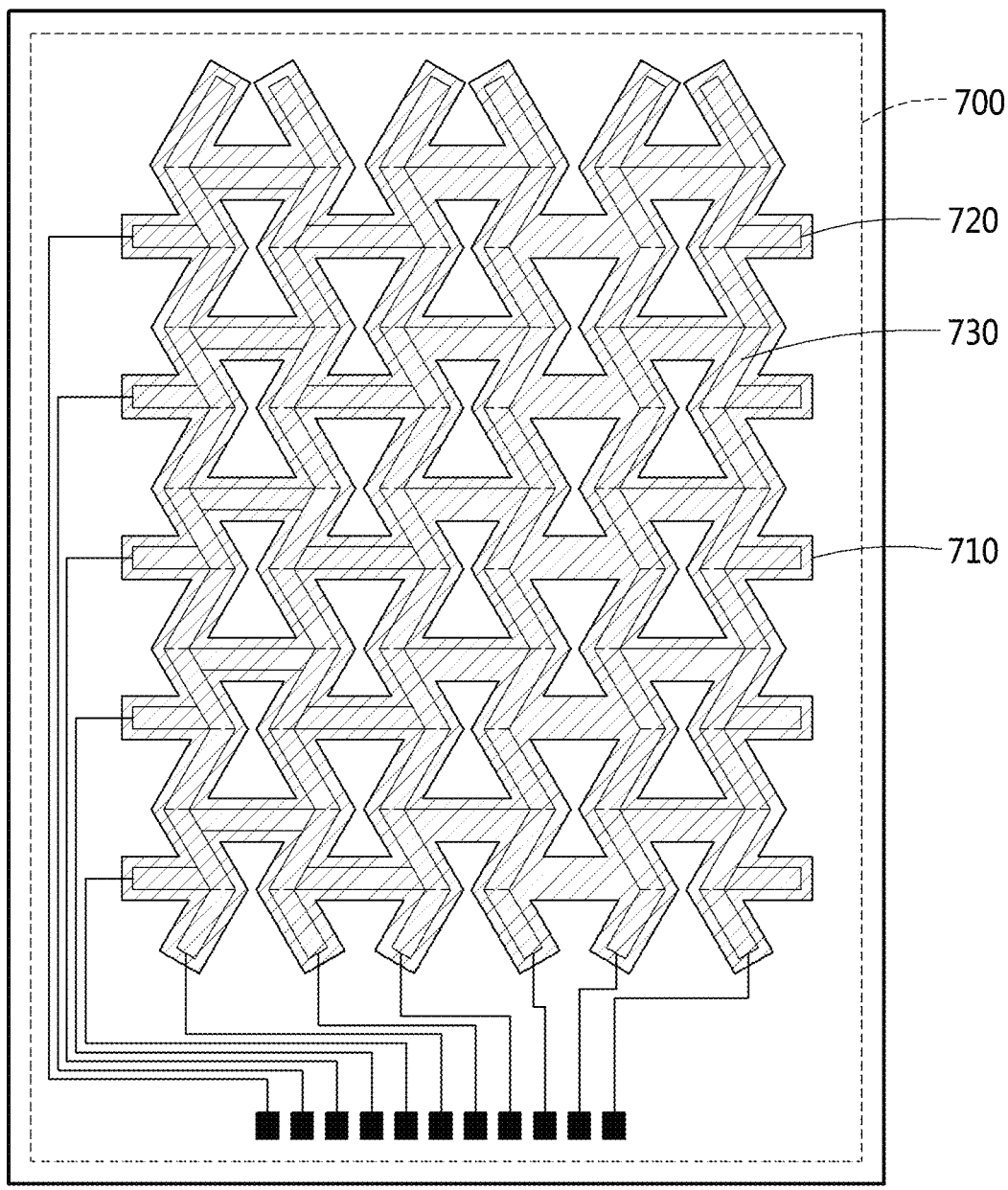
FIG. 7A illustrates a plan view of an ultra-thin touch panel including a flexible substrate having an auxetic mesh structure according to an embodiment of the present disclosure.

FIG. 7A illustrates a plan view of an ultra-thin touch panel including a flexible substrate having an auxetic mesh structure according to an embodiment of the present disclosure.

Referring to FIG. 7A, the touch panel 700 includes a flexible substrate 710, a plurality of first sensing electrodes 720, and a plurality of second sensing electrodes 730.

For example, the first sensing electrodes 720 are arranged in a first direction on the flexible substrate 710 and have a concave and convex pattern inclined in a reverse direction. That is, a concave and convex pattern wherein a concave region and a convex region are repeated may be observed in a plan view. In addition, the concave and convex pattern may have an inclined structure wherein the convex region widens toward a forward direction (or upward direction).

Meanwhile, the second sensing electrodes 730 are arranged in a second direction on the first sensing electrodes 720, thereby intersecting with the first sensing electrodes 720.

For example, the second sensing electrodes 730 are formed in a zigzag pattern of passing from a convex region of the first sensing electrodes 720 to an inclined region. Accordingly, in a plan view, the first and second sensing electrodes 720 and 730 form an auxetic mesh structure.

In addition, although not shown in FIG. 7A, an adhesive insulating layer is formed between the first sensing electrodes 720 and the second sensing electrodes 730.

Meanwhile, the flexible substrate 710 is patterned in a shape corresponding to the first and second sensing electrodes 720 and 730 by oxygen plasma etching, thereby forming an auxetic mesh structure. That is, the flexible substrate 710 may be fabricated into an auxetic mesh structure, wherein concave polygonal holes are present between rows and columns, by etching remaining regions except for a region where the first and second sensing electrodes 720 and 730 are located. In this process, the adhesive insulating layer is patterned along with the flexible substrate 710, thereby having the same mesh structure as the flexible substrate 710.

The stretchability of the flexible substrate 710 and the first and second sensing electrodes 720 and 730 may increase because deformation due to bending is absorbed by concave polygonal holes between rows and columns of the auxetic mesh structure as shown in FIG. 7A.

Accordingly, the respective sensing electrodes of the touch panel 700 may operate without being damaged despite being bent or folded by external pressure when applied to a flexible display device.

For example, the flexible substrate 710 may have an auxetic structure.

Figure 7B:
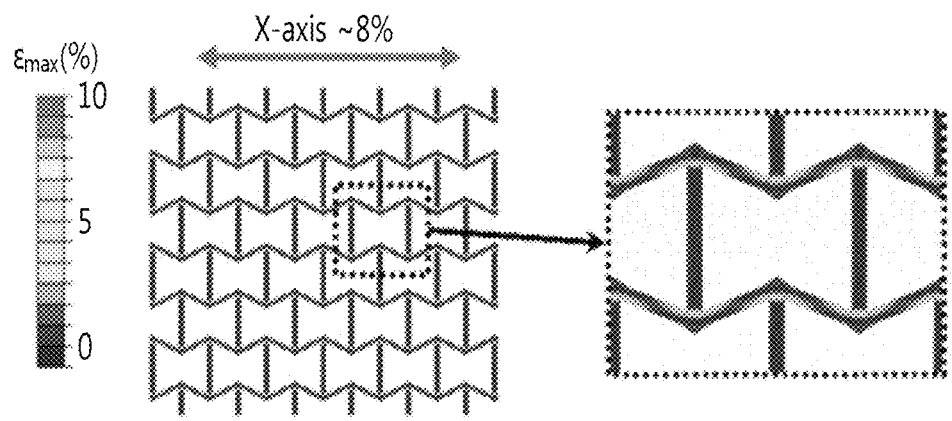
FIGS. 7B to 7D illustrate the strain of a flexible substrate having an auxetic mesh structure according to an embodiment of the present disclosure.
Figure 7C:
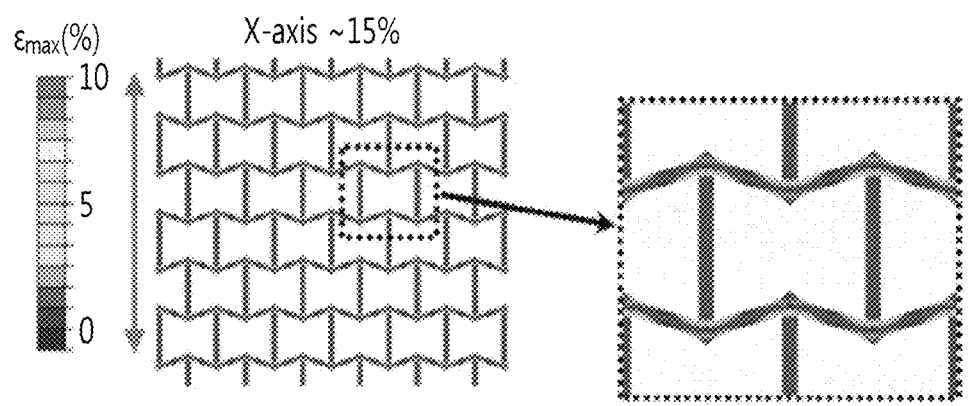
Figure 7D:
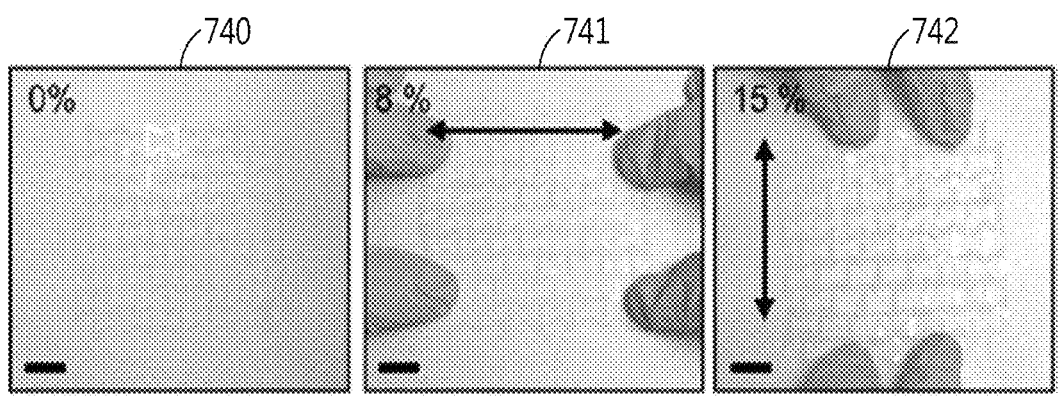

FIGS. 7B to 7D illustrate the strain of a flexible substrate having an auxetic mesh structure according to an embodiment of the present disclosure.

Referring to FIG. 7B, the auxetic mesh structure according to an embodiment of the present disclosure may provide a stretchability of up to 8% in an X-axis direction.

Referring to FIG. 7C, the auxetic mesh structure according to an embodiment of the present disclosure may provide a stretchability of up to 15% in a Y-axis direction.

FIG. 7D illustrates experimental operations related to FIGS. 7B and 7C. Image 740 illustrates a flexible substrate to which a specific force is not applied, image 741 illustrates a flexible substrate extended by 8% in a transverse direction, and image 742 illustrates a flexible substrate extended by 15% in a vertical direction.

FIGS. 8A to 8F illustrate a method of fabricating an ultra-thin touch panel using a mold according to an embodiment of the present disclosure.

Figure 8A:
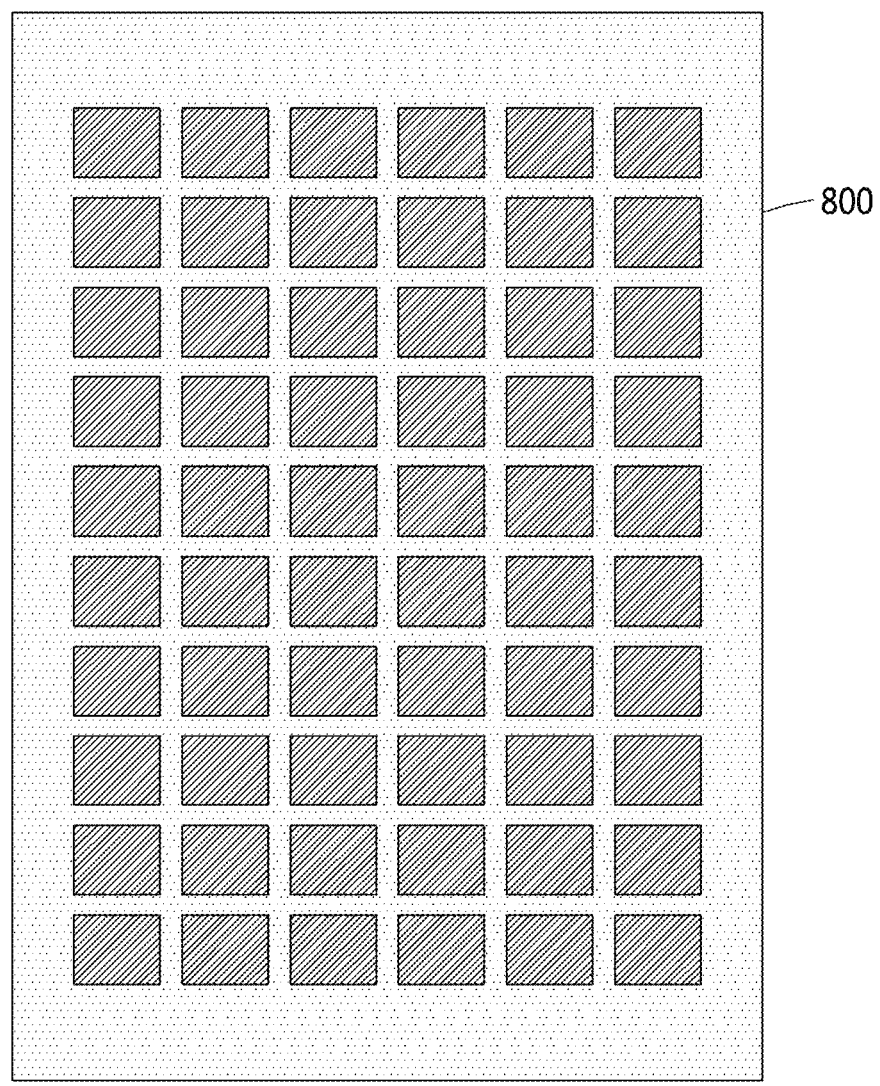
FIGS. 8A to 8F illustrate a method of fabricating an ultra-thin touch panel using a mold according to an embodiment of the present disclosure.

Referring to FIG. 8A, a mold 800 for fabricating a flexible substrate may be used in the method of fabricating an ultra-thin touch panel according to an embodiment of the present disclosure.

For example, the mold 800 may be modified as a mold for fabricating an auxetic substrate.

That is, the mold 800 may be fabricated in an auxetic structure as well as the structure shown in FIG. 8A.

Here, an auxetic substrate may have a shape similar to the flexible substrate 710 shown in FIG. 7A.

Figure 8B:
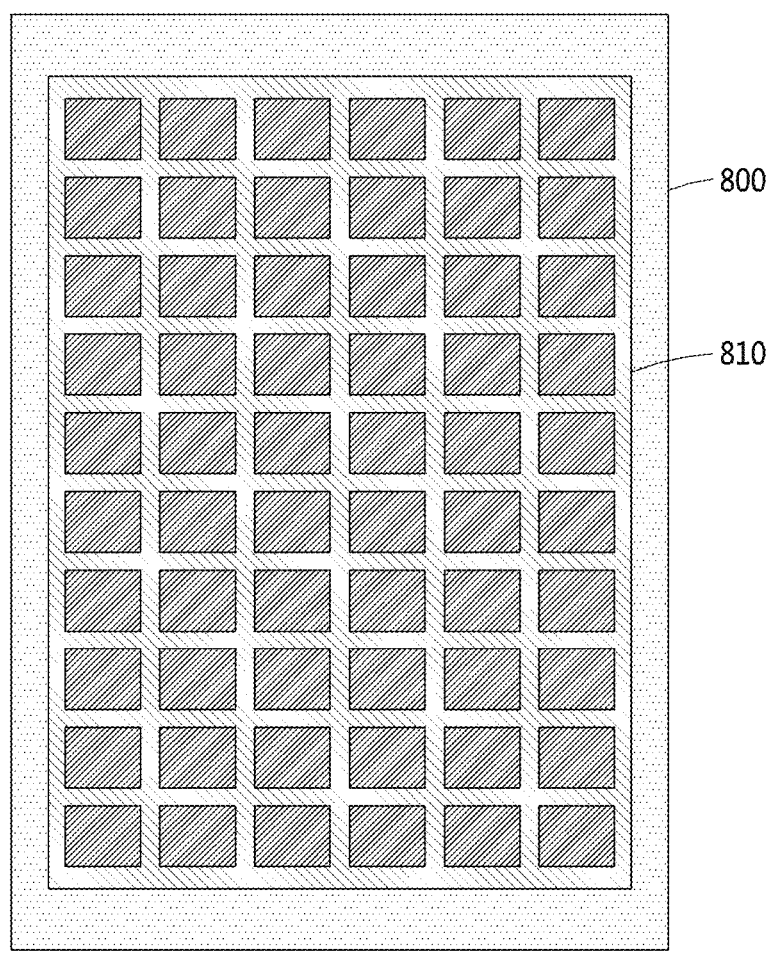

Referring to FIG. 8B, the method of fabricating an ultra-thin touch panel according to an embodiment of the present disclosure may be characterized by coating the mold 800 with a film formed of polydimethylsiloxanee (PDMS), Ecoflex, polyethylene terephthalate (PET), polycarbonate (PC), polyethersulfone (PES), polyimide (PI), polymethylmethacrylate (PMMA), a cyclo-olefin polymer (COP), or the like, thereby forming a substrate 810.

In the mold 800, the substrate 810 may be made of any one of polydimethylsiloxanee (PDMS), plastic, and metal.

Figure 8C:
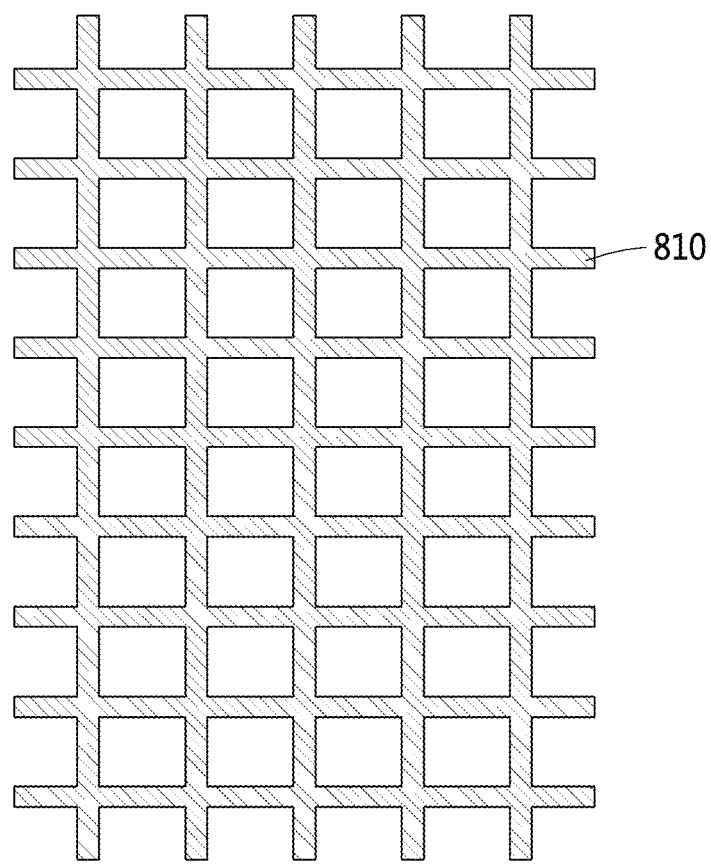

Referring to FIG. 8C, in the method of fabricating an ultra-thin touch panel according to an embodiment of the present disclosure, the substrate 810 may be transferred to a handling substrate, and an ultra-thin touch panel may be fabricated on the substrate 810 according to the procedure shown in FIGS. 2B to 2E.

For example, the substrate 810 may also be fabricated in an auxetic shape using a mold having an auxetic structure.

Figure 8D:
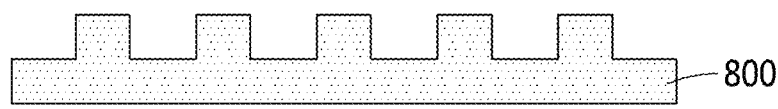
Figure 8E:
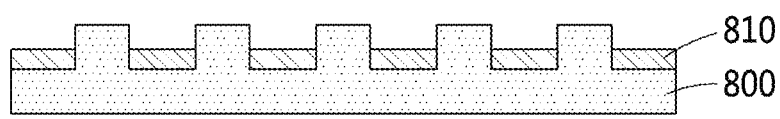

FIG. 8D illustrates a sectional view of the mold 800. Referring to FIG. 8E, FIG. 8E illustrates the mold 800 and the substrate 810. For example, the substrate 810 may be formed by coating the mold 800 with a film formed of polydimethylsiloxanee (PDMS), Ecoflex, polyethylene terephthalate (PET), polycarbonate (PC), polyethersulfone (PES), polyimide (PI), polymethylmethacrylate (PMMA), a cyclo-olefin polymer (COP), or the like.

When the substrate 810 is fabricated using the mold 800 by the method of fabricating an ultra-thin touch panel according to an embodiment of the present disclosure, the substrate 810 may be formed using polydimethylsiloxanee (PDMS) and Ecoflex that are not patterned or etched.

In addition, since the substrate 810 is made of a stretchable material such as polydimethylsiloxanee (PDMS) or Ecoflex, the stretchability of the substrate 810 having an auxetic structure may be maximized.

Figure 8F:
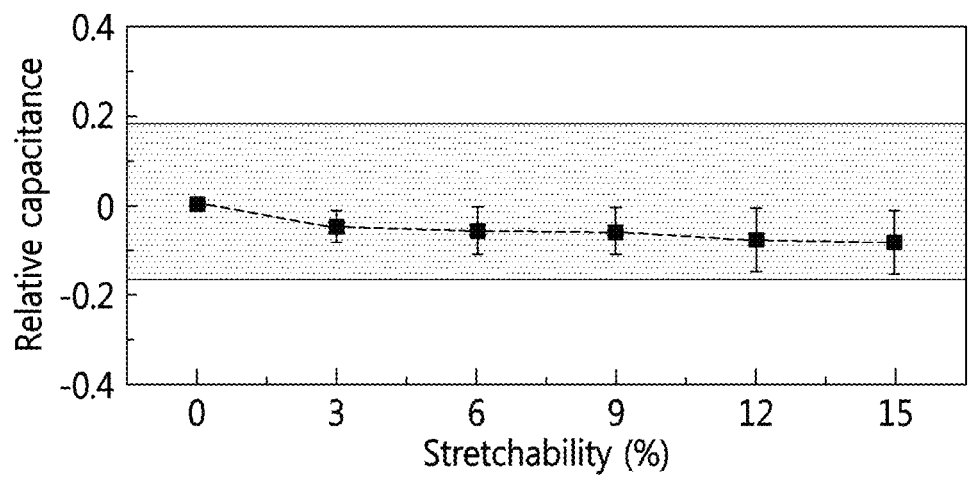

Referring to FIG. 8F, the ultra-thin touch panel having an auxetic mesh structure according to an embodiment of the present disclosure can exhibit small resistance and capacitance changes at a stretchability of about 15%.

Figure 9A:
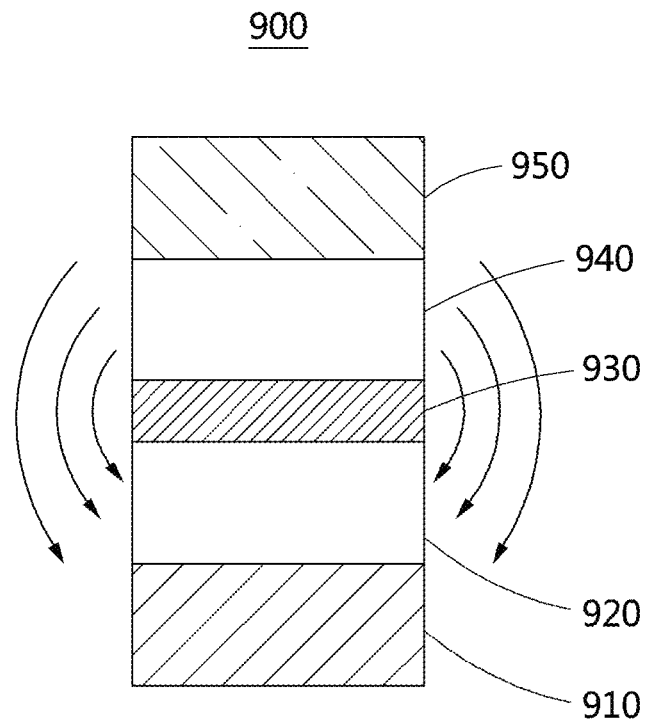
FIGS. 9A to 9C are graphs illustrating a capacitance ratio according to a distance between a touch panel, which senses touch in a proximity sensing manner of the present disclosure, and an object.
Figure 9B:
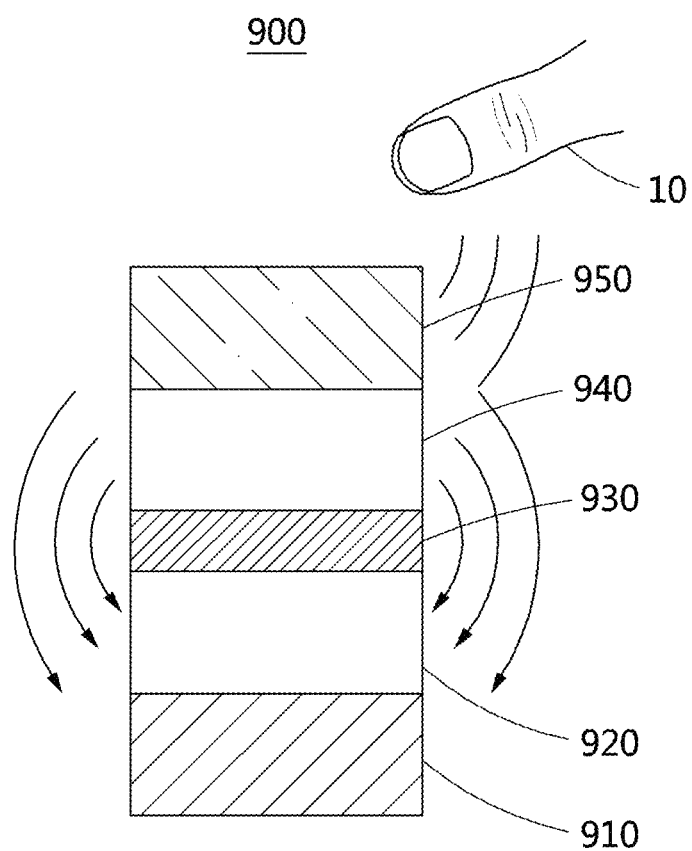
Figure 9C:
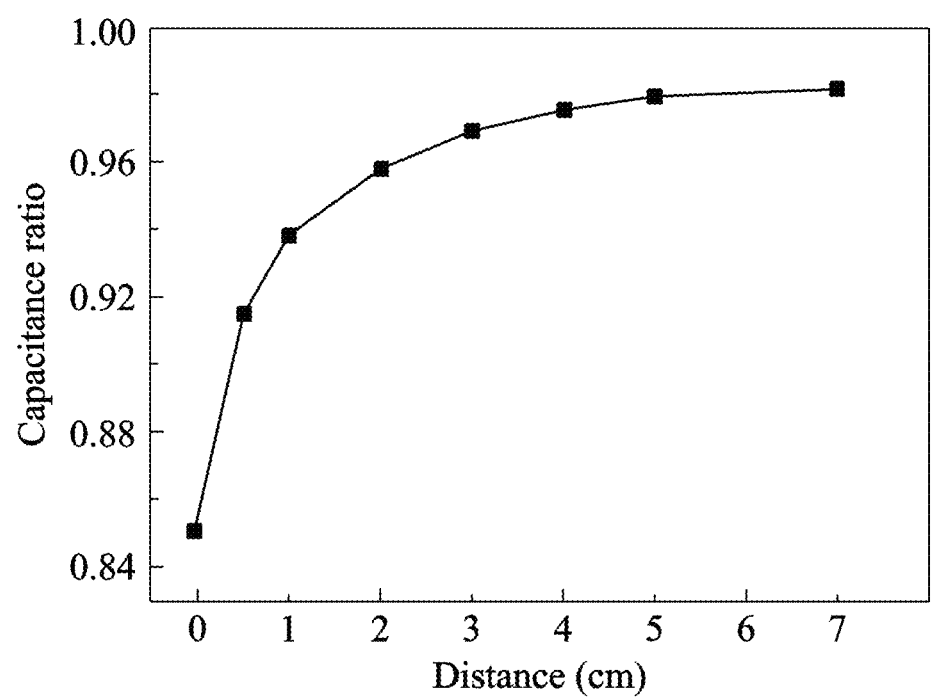

FIGS. 9A to 9C are graphs illustrating a capacitance ratio according to a distance between a touch panel of the present disclosure, which senses touch in a proximity sensing manner, and an object.

FIG. 9C is a graph showing a capacitance ratio according to a distance between a touch panel for sensing touch in a proximity sensing manner and a finger.

A touch panel 900 illustrated in FIGS. 9A and 9B may have a polygonal mesh structure according to the embodiments of the present disclosure and may include a first flexible substrate 910, a first sensing electrode 920, an adhesive insulating layer 930, a second sensing electrode 940 and a second flexible substrate 950.

The touch panel 900 may sense physical contact of an object, and may operate a proximity sensor capable of sensing touch even in a non-contact state when an object approaches the touch panel 900.

In particular, the touch panel 900 has a preset capacitance value between the first sensing electrode 920 and the second sensing electrode 940 in a state in which an object does not approach within a touch sensing distance.

On the other hand, when a finger 10 approaches within a touch sensing distance as shown in FIG. 9B, capacitance between the first intermediate electrode 920 and the second intermediate electrode 940 is reduced due to a current flowing through a finger.

FIG. 9C is a graph showing a capacitance (C0) before the finger 10 touches the touch panel 900 and a capacitance (C) of the touch panel 900 dependent upon a touch sensing distance, i.e., a capacitance ratio dependent upon a finger touch sensing distance (or approach distance).

Referring to FIG. 9C, a capacitance ratio increases with increasing distance between the touch panel 900 and the finger 10. That is, when the finger 10 is outside a touch sensing region of the touch panel 900, a capacitance between the first sensing electrode 920 and the second sensing electrode 940 is not changed, whereby a capacitance ratio (C/C0) may be up to 1.

In addition, a capacitance ratio is decreased as a distance between the touch panel 900 and the finger 10 is shortened. That is, a capacitance is decreased as a distance between the touch panel 900 and the finger 10 is shortened from 7 cm to 0 cm, whereby a capacitance ratio (C/C0) is less than 1. In addition, a capacitance ratio is less than 1 up to a distance of 7 cm, which indicates that the touch panel 900 senses a change in a capacitance due to approach of a finger.

Figure 10A:
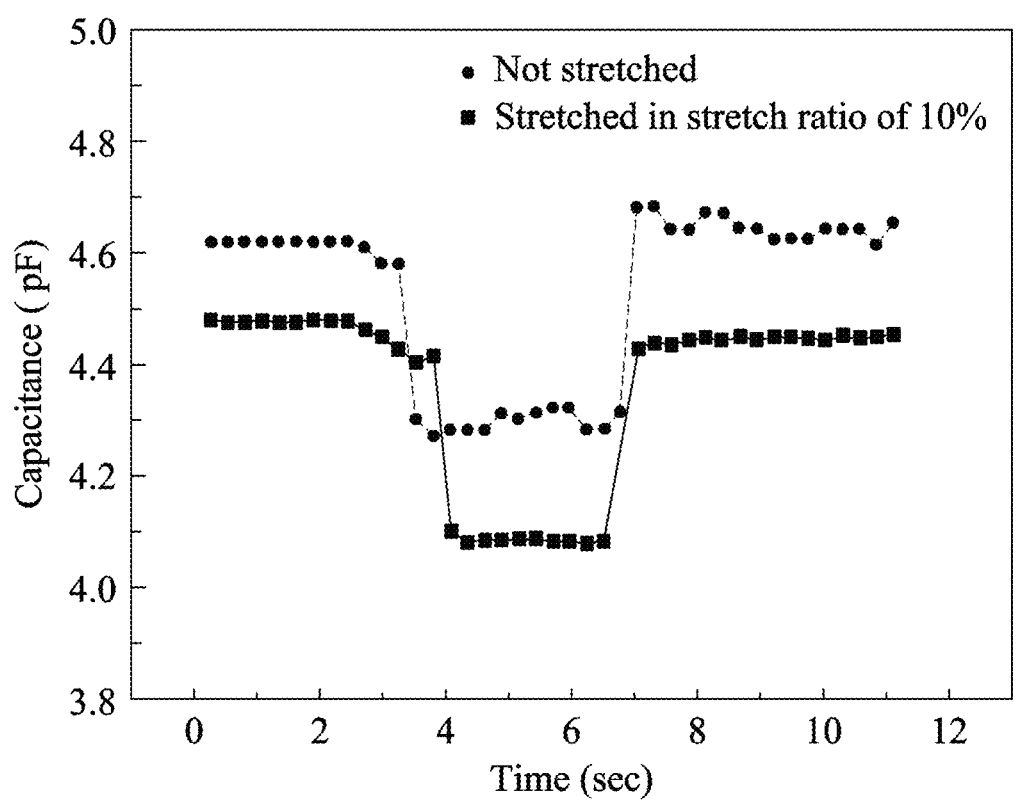
FIGS. 10A to 10C illustrate graphs related to the performance of an ultra-thin touch panel according to an embodiment of the present disclosure.
Figure 10B:
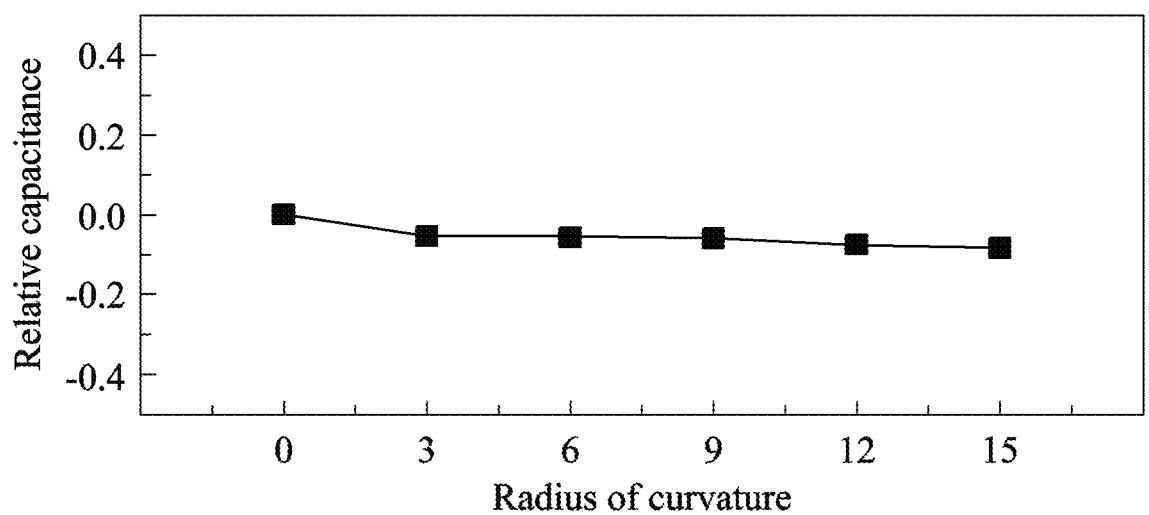
Figure 10C:
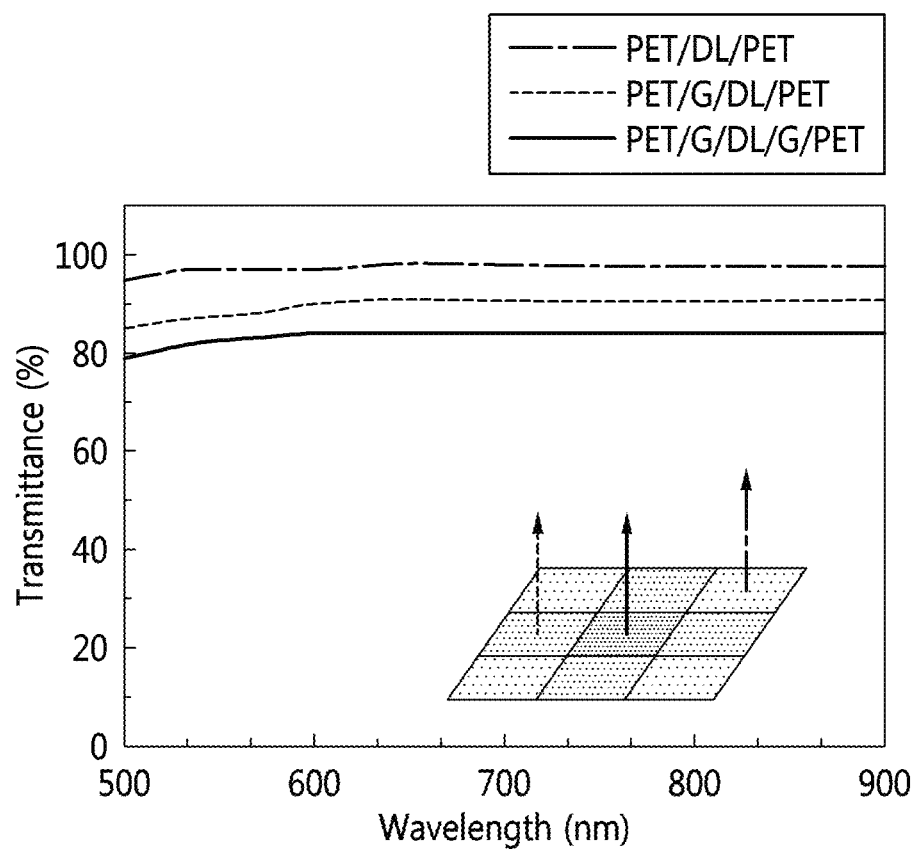

FIGS. 10A to 10C illustrate graphs related to the performance of an ultra-thin touch panel according to an embodiment of the present disclosure.

FIGS. 10A and 10B are graphs showing capacitance change in the touch panel according to an example of the present disclosure.

FIG. 10A is a graph showing capacitance change before stretching the touch panel and after stretching the touch panel in a stretch ratio of 10%. When a user touches the touch panel with a finger for between 4 seconds and 10 seconds, a capacitance of about 4.3 pF was measured before stretching the touch panel and a capacitance of about 4.1 pF was measured after stretching the touch panel in a stretch ratio of 10%. That is, although the touch panel is stretched, capacitance change is not great, and thus, a touch position may be normally sensed also in a stretched state.

Referring to FIG. 10B, a capacitance before stretching the touch panel was set to 0, and relative capacitance change values were measured after stretching the touch panel in stretch ratios of 3%, 10%, 9%, 12%, and 15%. As a result, relative capacitances were changed within a range of 0 to −0.2 during stretching in a stretch ratio of 15%. That is, it can be confirmed that capacitance change, i.e., an operation of sensing a touch position, is not affected although the touch panel is stretched.

FIG. 10C illustrates light transmittances of upper and lower panels of a graphene-based capacitive sensor including the ultra-thin touch panel according to an embodiment of the present disclosure. The ultra-thin touch panel according to an embodiment of the present disclosure may provide a high light transmittance.

FIGS. 11A to 11F illustrate a touch operation on an ultra-thin touch panel according to an embodiment of the present disclosure.

More particularly, FIGS. 11A to 11F illustrate a touch recognition operation of the ultra-thin touch panel according to an embodiment of the present disclosure mounted on a user's wrist.

Figure 11A:
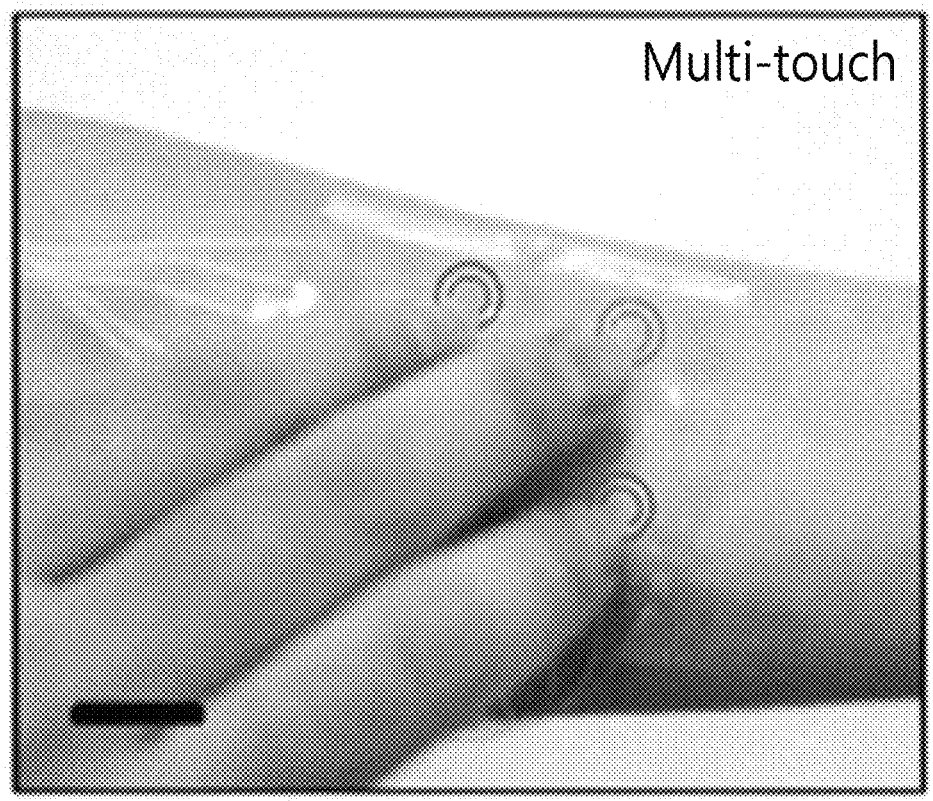
FIGS. 11A to 11F illustrate a touch operation on an ultra-thin touch panel according to an embodiment of the present disclosure.

Referring to FIG. 11A, the ultra-thin touch panel according to an embodiment of the present disclosure may recognize a plurality of touch inputs.

Figure 11B:
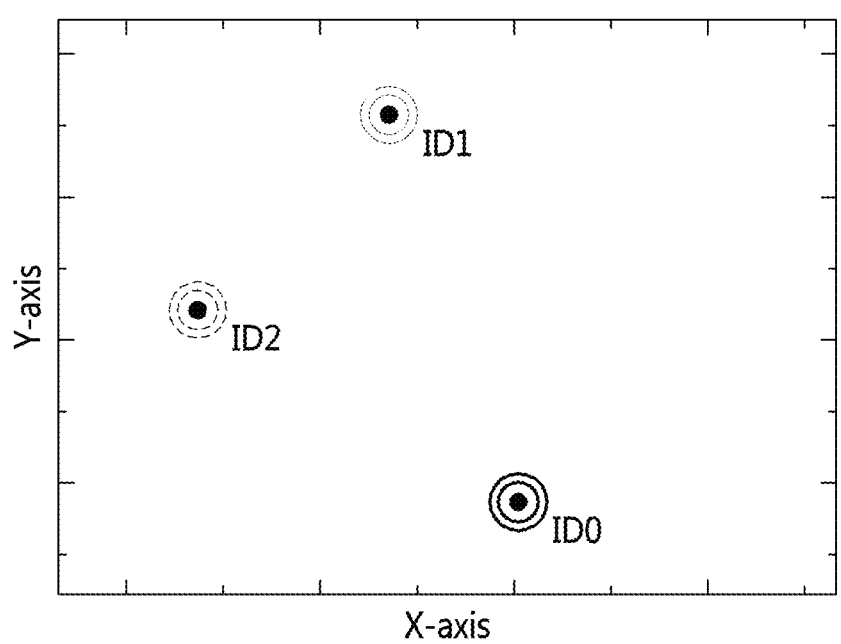

Referring to FIG. 11B, touch inputs are shown on a graph. The touch inputs to three points may be recognized based on an X-axis and a Y-axis.

Figure 11C:
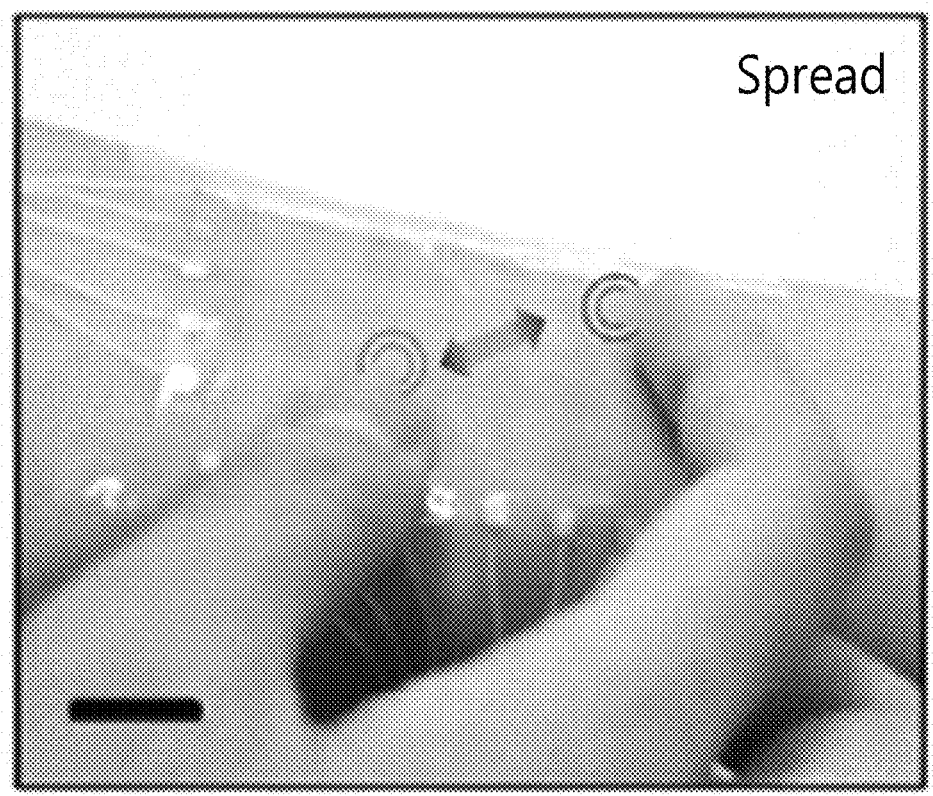

Referring to FIG. 11C, the ultra-thin touch panel according to an embodiment of the present disclosure may recognize a spreading touch input.

Figure 11D:
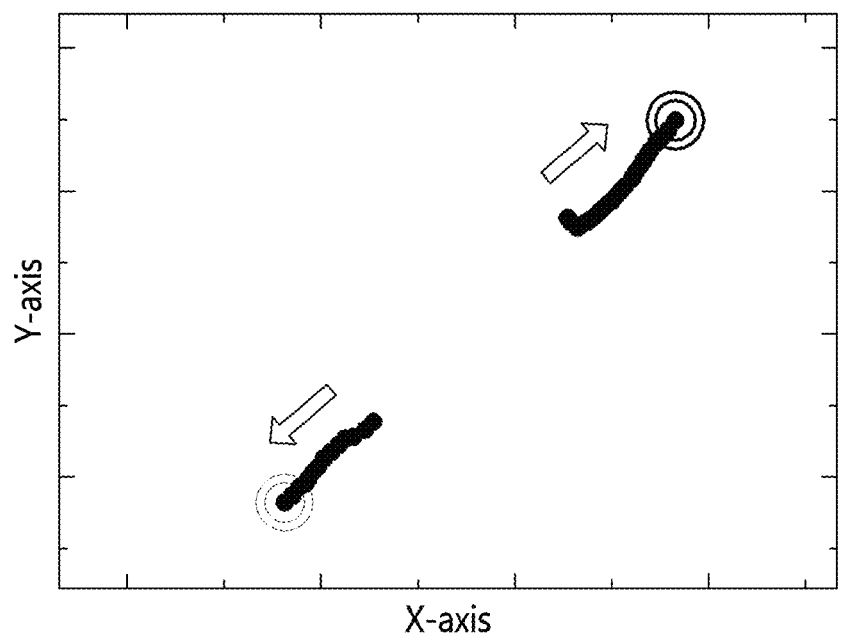

Referring to FIG. 11D, touch inputs are shown on a graph. The spreading touch inputs may be recognized based on an X-axis and a Y-axis.

Figure 11E:
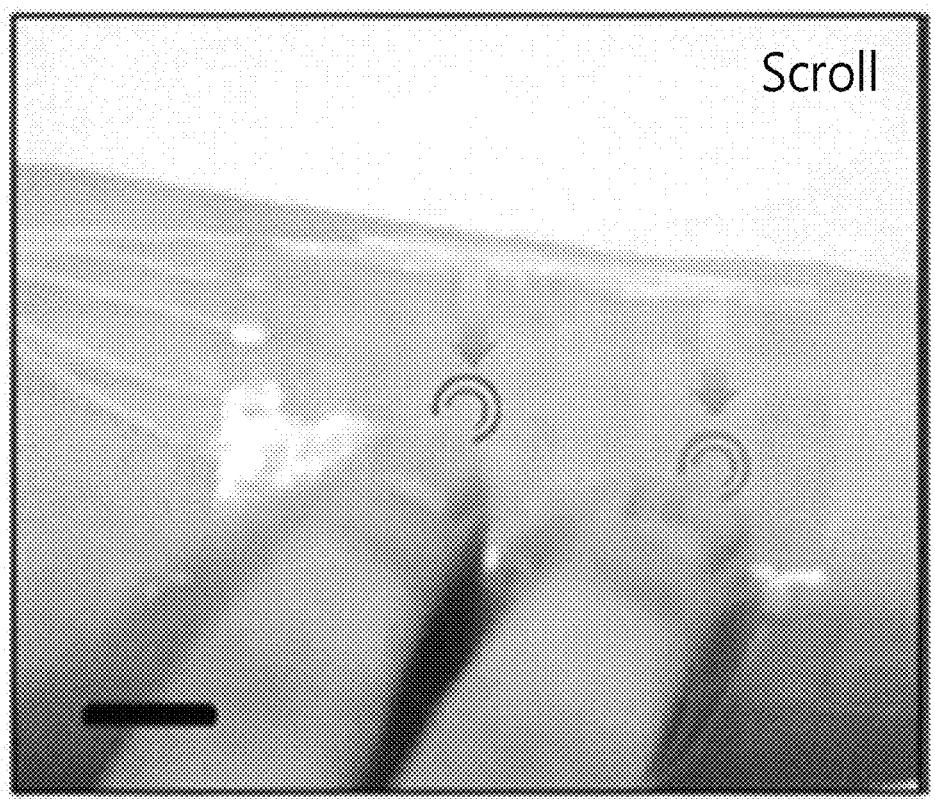

Referring to FIG. 11E, the ultra-thin touch panel according to an embodiment of the present disclosure may recognize scroll touch input.

Figure 11F:
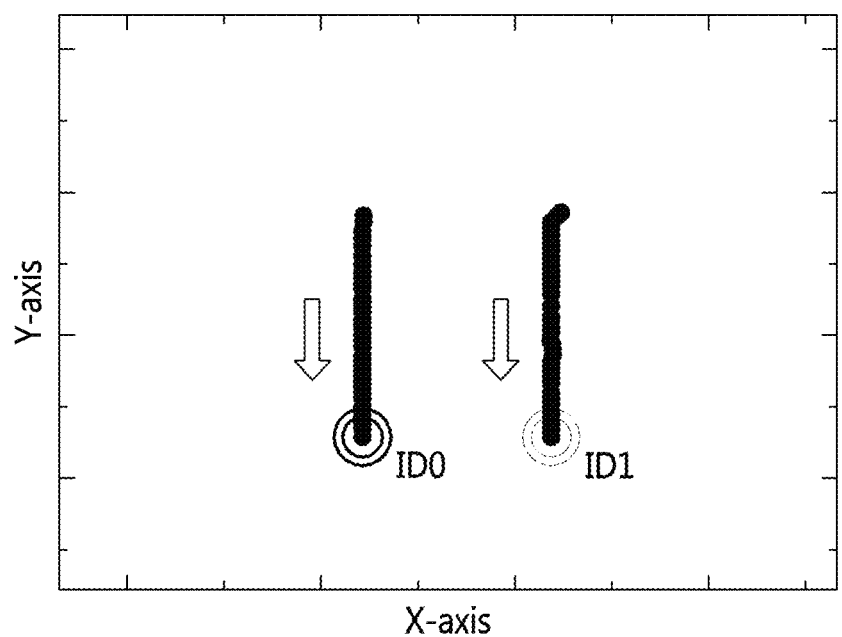

Referring to FIG. 11F, touch inputs are shown on a graph. The scroll touch inputs may be recognized based on an X-axis and a Y-axis scroll.

Figure 12A:
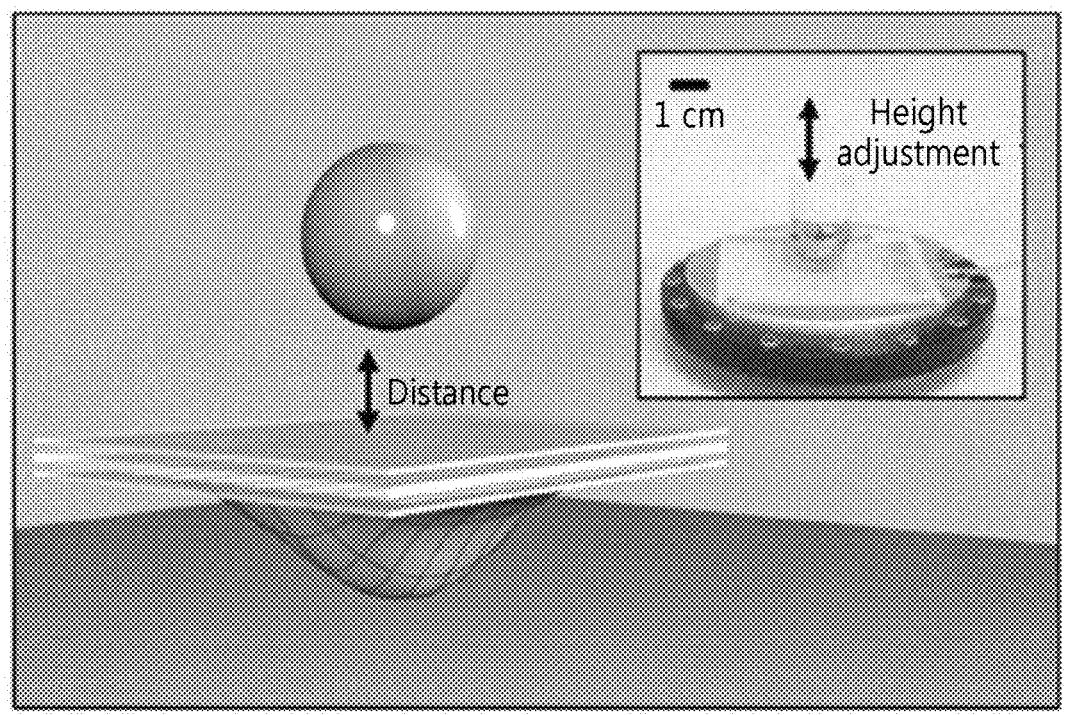
FIGS. 12A to 12C are schematic 3D drawings illustrating measurement results of an ultra-thin touch panel in a non-contact mode according to an embodiment of the present disclosure.
Figure 12B:
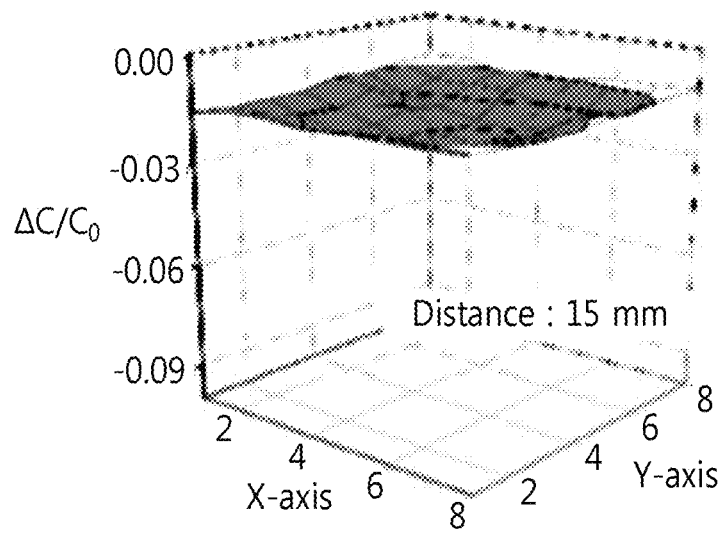
Figure 12C:
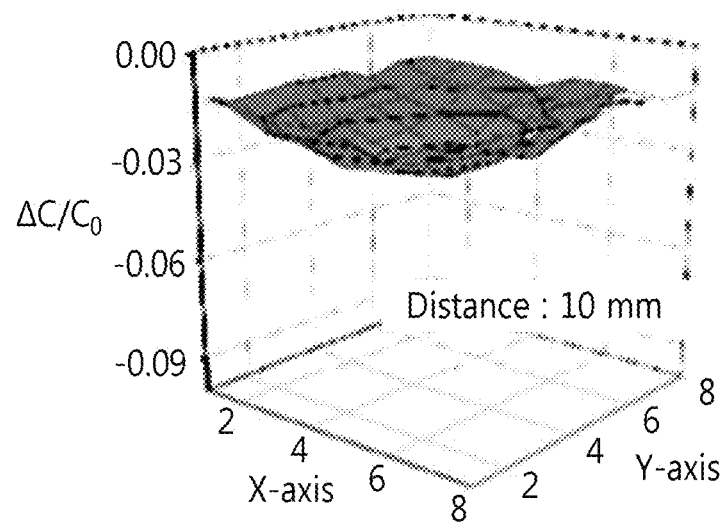

FIGS. 12A to 12C are schematic 3D drawings illustrating measurement results of an ultra-thin touch panel in a non-contact mode according to an embodiment of the present disclosure.

In particular, FIGS. 12A to 12C illustrate capacitance ratios (C/C0) of an ultra-thin touch panel in a non-contact mode using a conductive iron ball.

Referring to FIG. 12A, a capacitance ratio (C/C0) of the ultra-thin touch panel according to an embodiment of the present disclosure may be measured while changing a distance between the iron ball and a surface of the ultra-thin touch panel. Here, distance change may be the same as height change.

FIG. 12B illustrates a capacitance ratio (C/C0) when an iron ball is located at a distance of 15 mm from the ultra-thin touch panel according to an embodiment of the present disclosure.

FIG. 12C illustrates a capacitance ratio (C/C0) when an iron ball is located at a distance of 10 mm from the ultra-thin touch panel according to an embodiment of the present disclosure.

Figure 13:
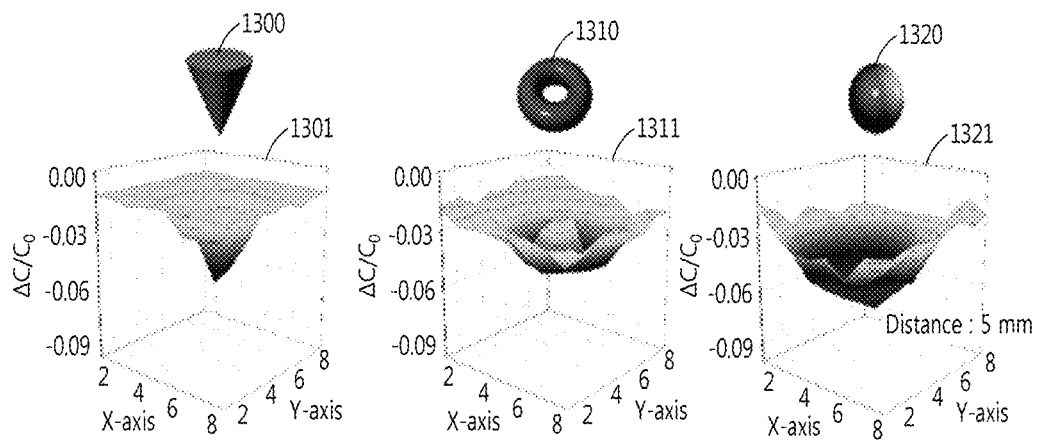
FIG. 13 illustrates measurement data upon sensing various shapes with an ultra-thin touch panel according to an embodiment of the present disclosure.

FIG. 13 illustrates measurement data upon sensing various shapes with an ultra-thin touch panel according to an embodiment of the present disclosure.

Referring to FIG. 13, graph image 1301 illustrates a capacitance ratio (C/C0) when a cone shape 1300 approaches the ultra-thin touch panel according to an embodiment of the present disclosure.

Graph image 1311 illustrates a capacitance ratio (C/C0) when a ring shape 1310 approaches the ultra-thin touch panel according to an embodiment of the present disclosure.

Graph image 1321 illustrates a capacitance ratio (C/C0) when a sphere shape 1320 approaches the ultra-thin touch panel according to an embodiment of the present disclosure.

Measurement of the capacitance ratios (C/C0) of FIGS. 12B to 13 is possible because the ultra-thin touch panel is thin. For example, the ultra-thin touch panel may also be referred to as a 3D touch sensor.

In general, existing touch panels including a cover glass having a thickness of 0.5 T (0.5 mm) or more have sensitivity capable of reacting only when they have direct contact.

However, the ultra-thin touch panel according to an embodiment of the present disclosure is fabricated into an ultra-thin structure having a thickness of 35 μm or more and thus has maximized sensitivity to an object on a touch sensor, thereby being capable of reacting in a non-contact touch manner. Accordingly, surface information of a conductive object may be obtained.

Figure 14A:
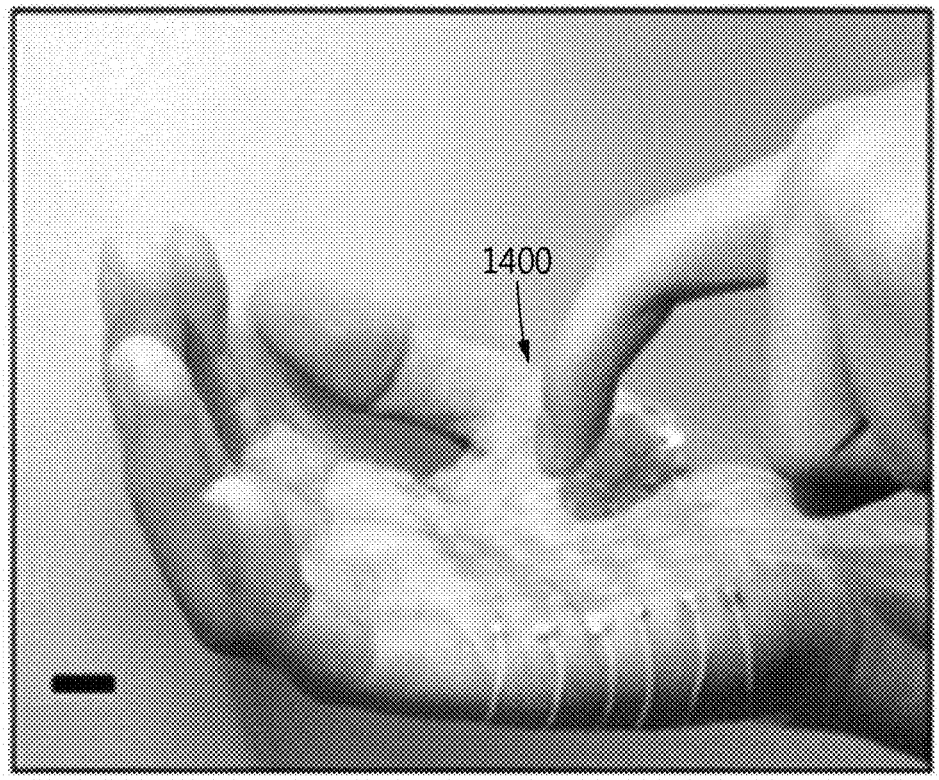
FIGS. 14A to 14C illustrate an optical image of an ultra-thin touch panel according to an embodiment of the present disclosure and capacitance changes in the ultra-thin touch panel according to a finger approach.
Figure 14B:
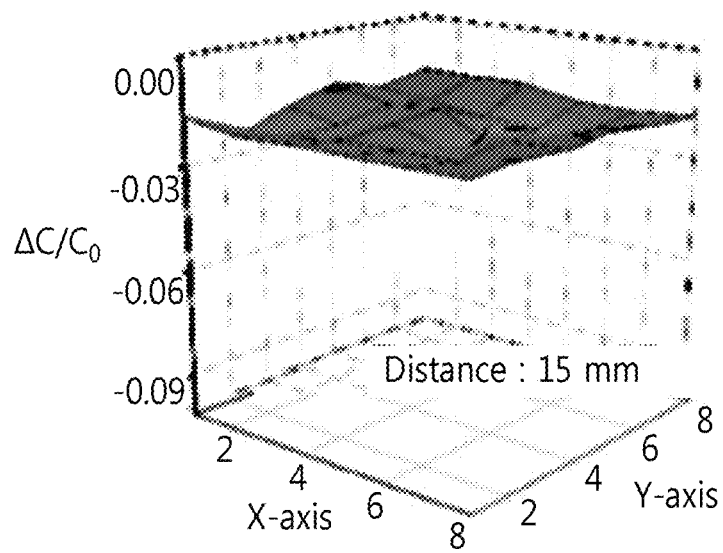
Figure 14C:
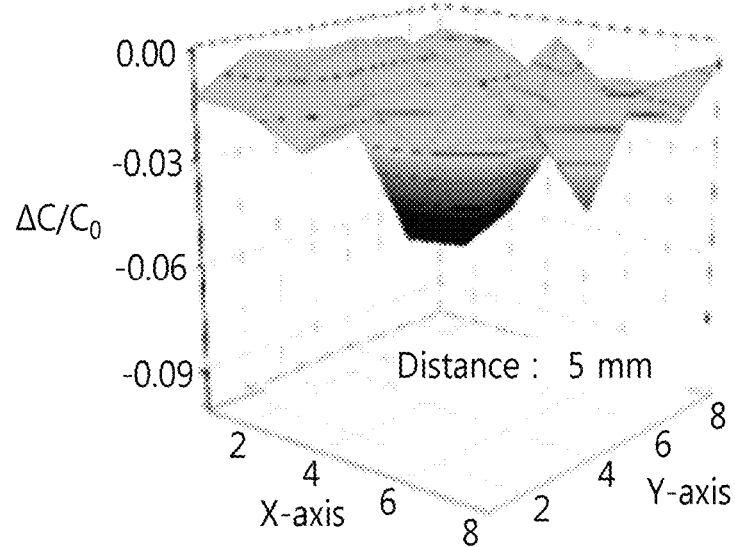

FIGS. 14A to 14C illustrate an optical image of an ultra-thin touch panel according to an embodiment of the present disclosure and capacitance changes in the ultra-thin touch panel according to finger approach.

In particular, FIGS. 14A to 14C illustrate a capacitance ratio (C/C0) according to approach of a finger to the ultra-thin touch panel.

Referring to FIG. 14A, the ultra-thin touch panel according to an embodiment of the present disclosure is mounted on a palm and a finger approaches the ultra-thin touch panel in an arrow direction 1400.

FIGS. 14B and 14C illustrate capacitance ratios (C/C0) according to an approach distance of a finger to the ultra-thin touch panel.

FIG. 14B illustrates a capacitance ratio (C/C0) when a finger is located at a distance of 15 mm from the ultra-thin touch panel.

FIG. 14C illustrates a capacitance ratio (C/C0) when a finger is located at a distance of 5 mm from the ultra-thin touch panel.

Figure 15A:
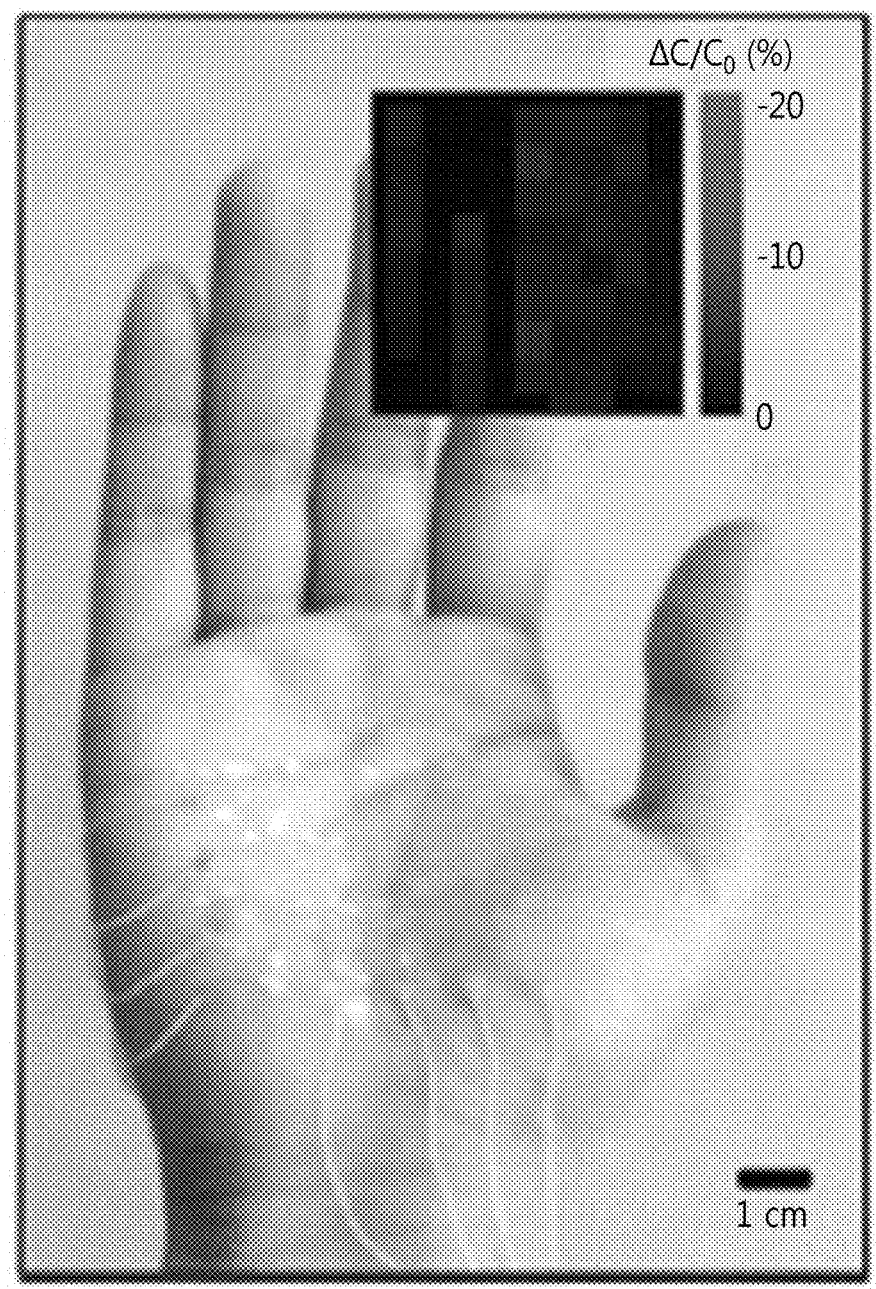
FIGS. 15A to 15C illustrate an embodiment of controlling cars using an ultra-thin touch panel according to an embodiment of the present disclosure.
Figure 15B:
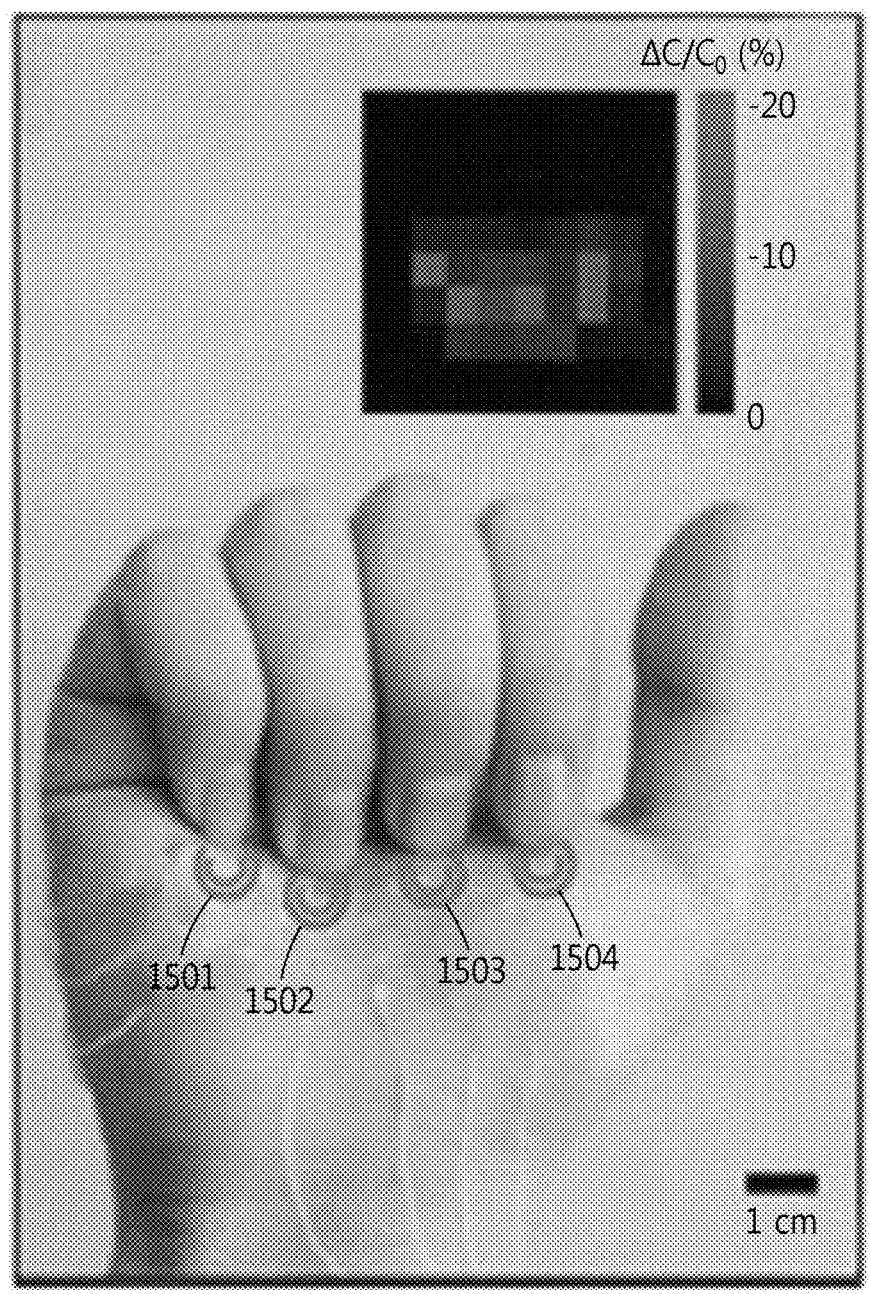
Figure 15C:
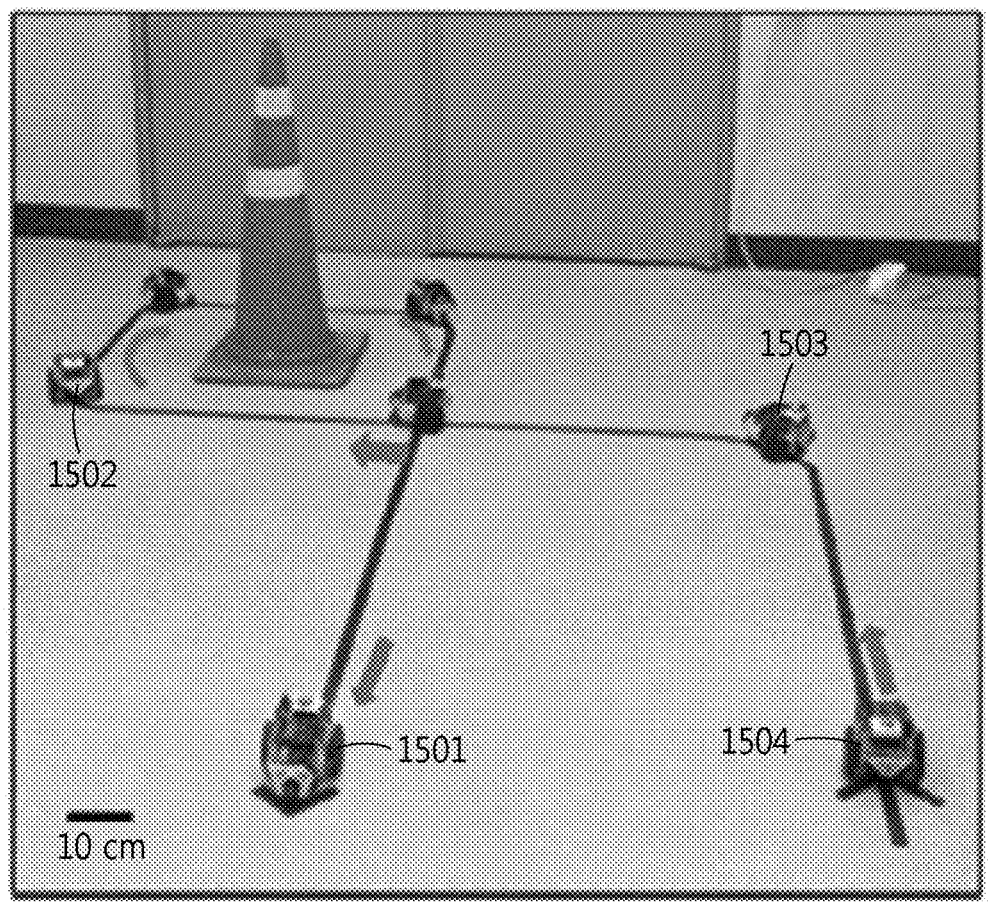

FIGS. 15A to 15C illustrate an embodiment of controlling cars using an ultra-thin touch panel according to an embodiment of the present disclosure.

In particular, FIGS. 15A to 15C illustrate an operation of remotely controlling toy cars though the ultra-thin touch panel according to an embodiment of the present disclosure which is mounted on a palm in a state in which the ultra-thin touch panel is stretchable due to movement of the palm.

Referring to FIG. 15A, the ultra-thin touch panel according to an embodiment of the present disclosure may be mounted on a user's palm and may sense touch in this state.

A graph located at an upper part of FIG. 15A, as a graph representing a touch input degree, shows that there is no touch input.

Referring to FIG. 15B, the ultra-thin touch panel according to an embodiment of the present disclosure may be mounted on a user's palm and may sense touch in this state.

A graph located at an upper part of FIG. 15B, as a graph representing a touch input degree, shows that there is a plurality of touch inputs.

The ultra-thin touch panel according to an embodiment of the present disclosure may recognize touch inputs to a first point 1501, a second point 1502, a third point 1503, and a fourth point 1504.

For example, the ultra-thin touch panel may recognize touch to the first point 1501, thereby stopping the toy cars.

In addition, the ultra-thin touch panel may recognize touch input to the second point 1502, thereby rotating the toy cars in a clockwise direction.

In addition, the ultra-thin touch panel may recognize touch input to the third point 1503, thereby rotating the toy cars in a counterclockwise direction.

In addition, the ultra-thin touch panel may recognize a touch input to the fourth point 1504, thereby moving the toy cars forward.

Referring to FIG. 15C, the ultra-thin touch panel according to an embodiment of the present disclosure may recognize touch inputs to the first to fourth points 1501 to 1504, thereby being capable of stopping the toy cars, rotating the same clockwise or counterclockwise, or moving the same forward.

Figure 16A:
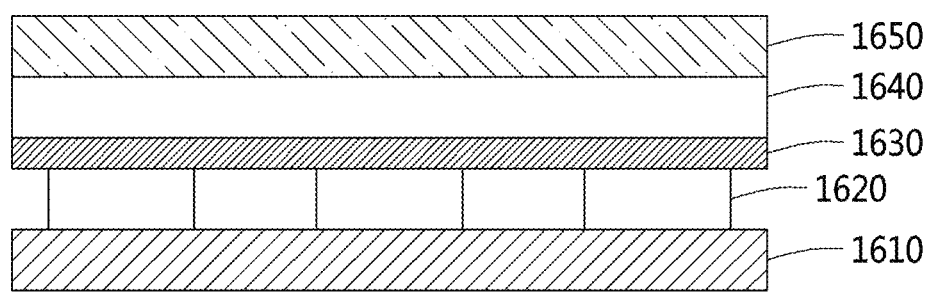
FIGS. 16A to 16C illustrate sectional views of ultra-thin touch panels according to an embodiment of the present disclosure.
Figure 16B:
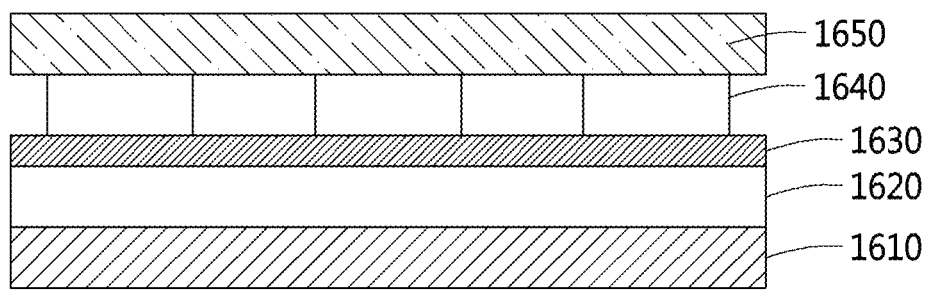
Figure 16C:
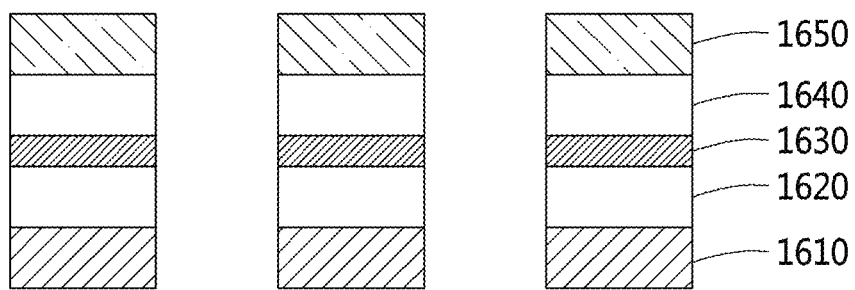

FIGS. 16A to 16C illustrate sectional views of ultra-thin touch panels according to an embodiment of the present disclosure.

FIG. 16A is a sectional view of a touch panel taken along a vertical line, i.e., cut along a second-direction column.

A plurality of first sensing electrodes 1620 are arranged to be spaced from each other in a first direction on a first flexible substrate 1610, and one second sensing electrode 1640 is attached to the first sensing electrodes 1620 via an adhesive insulating layer 1630. In addition, a second flexible substrate 1650 is attached to the second sensing electrode 1640.

FIG. 16B is a sectional view of a touch panel taken along a horizontal line, i.e., cut in a first-direction row.

One first sensing electrode 1620 is disposed on a first flexible substrate 1610, and a plurality of second sensing electrodes 1640 is attached to one first sensing electrode 1620 via the adhesive insulating layer 1630. In addition, a second flexible substrate 1650 is attached to a plurality of second sensing electrodes 1640.

FIG. 16C is a sectional view of a touch panel taken along a diagonal line.

A plurality of first sensing electrodes 1620 is disposed on a first flexible substrate 1610, and a plurality of second sensing electrodes 1640 is attached to a plurality of first sensing electrodes 1620 via an adhesive insulating layer 1630. In addition, a second flexible substrate 1650 is attached to the second sensing electrodes 1640.

Since the first flexible substrate 1610, the second flexible substrate 1650, and the adhesive insulating layer 1630 have a tetragonal mesh structure and "the first sensing electrodes 1620 and the second sensing electrodes 1640" form a tetragonal mesh structure, all the components show a pattern of being spaced at a regular interval due to holes present between rows and columns of the tetragonal mesh structure when taken along a diagonal line.

FIGS. 17A to 17G illustrate a method of fabricating a touch panel according to an embodiment of the present disclosure.

FIGS. 17A to 17G illustrate a method of fabricating a touch panel according to an example of the present disclosure. FIGS. 17A to 17G illustrate sectional views cut to pass through holes present in a tetragonal mesh structure.

Figure 17A:
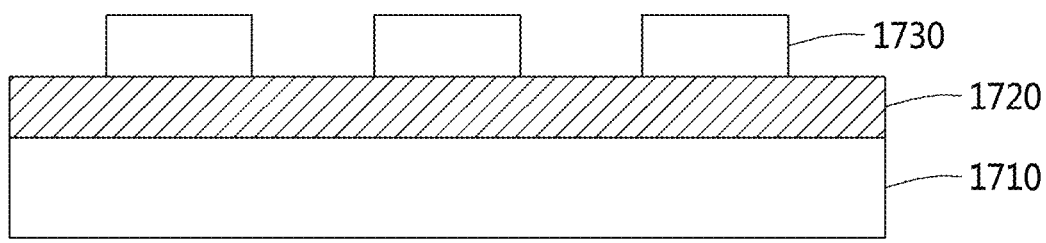
FIGS. 17A to 17G illustrate a method of fabricating a touch panel according to an embodiment of the present disclosure.

As shown in FIG. 17A, a first flexible substrate 1720 is formed on a metal substrate 1710 such as a copper (Cu) substrate, and then a plurality of first sensing electrodes 1730 is formed on the first flexible substrate 1720.

First, a film formed of polyethylene terephthalate (PET), polycarbonate (PC), polyethersulfone (PES), polyimide (PI), polymethylmethacrylate (PMMA), a cyclo-olefin polymer (COP), or the like is coated on the metal substrate 1710 to from the first flexible substrate 1720.

Graphene may be transferred onto the first flexible substrate 1720 and then patterned the same, thereby forming the first sensing electrodes 1730 arranged in a first direction.

Here, graphene may be fabricated in a thin film shape to transfer the same onto the first flexible substrate 1720. A graphene film may be fabricated by a method of mechanically peeling high-quality graphite, a method of selectively sublimating silicon (Si) from a SiC wafer, a method of using chemical oxidation/reduction reaction of graphite, a chemical vapor deposition (CVD) method, or the like. A graphene film fabricated by the method may be transferred onto the first flexible substrate 1720 using a roll-to-roll method, a wet transfer method, a dry transfer method, a polydimethylsiloxane (PDMD) transfer method, a direct transfer method, or the like.

Alternatively, a plurality of second sensing electrodes 1750 may be formed using, other than graphene, a carbon nanotube, a metal wire, or a metal mesh.

Figure 17B:
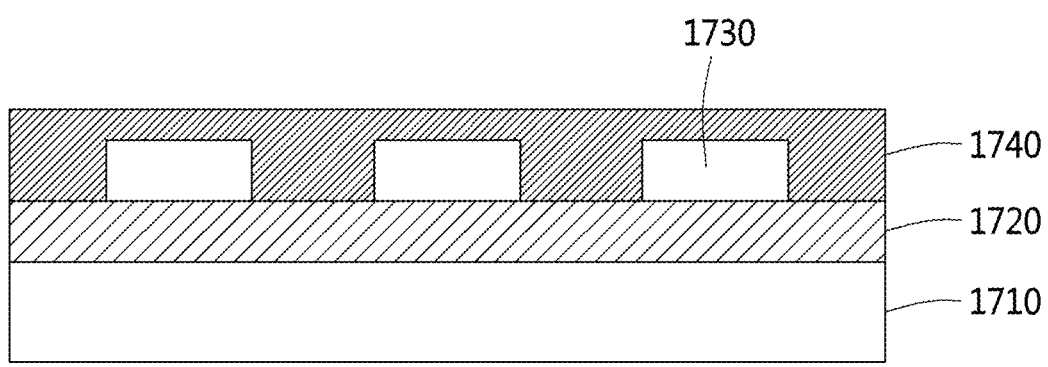

Subsequently, as shown in FIG. 17B, an optically clean resin (OCR), an optically clean adhesive (OCA), or an SU-8 material is coated on the first sensing electrodes 1730 to form an adhesive insulating layer 1740. The adhesive insulating layer 1740 may be provided to bond the first sensing electrodes 1730 to a plurality of second sensing electrodes 1750 to be formed in a subsequent process.

Figure 17C:
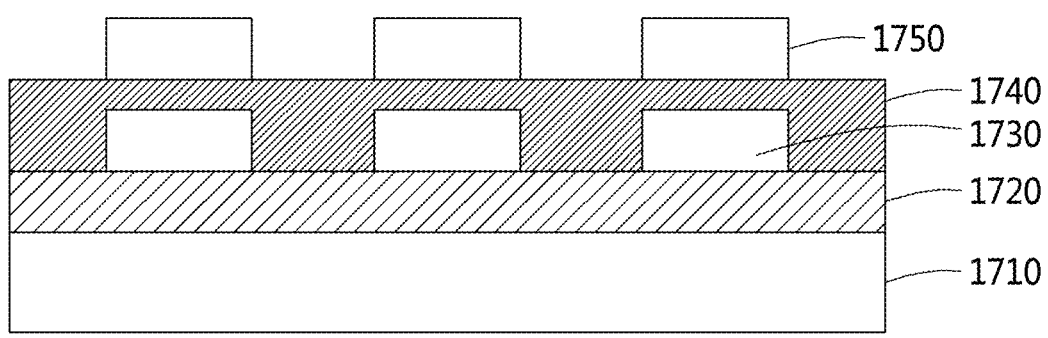

Meanwhile, as shown in FIG. 17C, graphene is transferred onto the adhesive insulating layer 1740, and then the second sensing electrodes 1750 are patterned and arranged in a second direction to perpendicularly interest the first sensing electrodes 1730. Since methods of fabricating and transferring the graphene film are the same as those used to form the first sensing electrodes 1730, a detailed description thereof is omitted. In addition, the second sensing electrodes 1750 may also be formed of a carbon nanotubes, a metal wire, or a metal mesh.

Figure 17D:
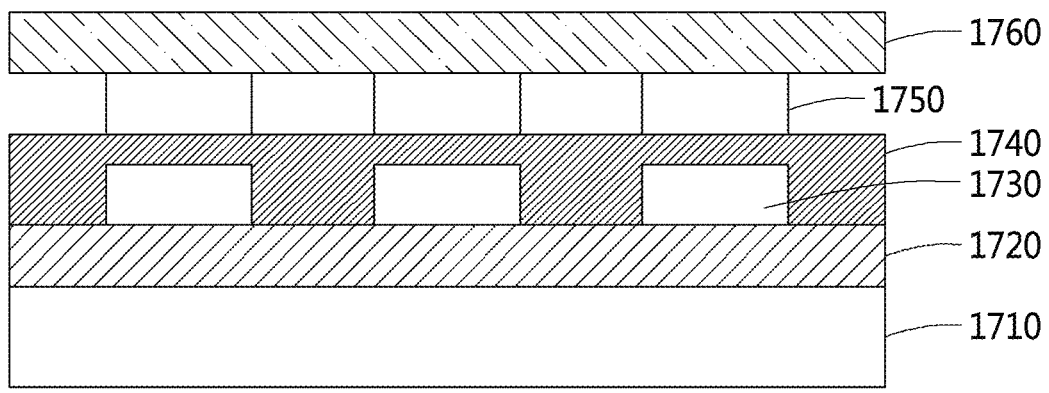

As shown in FIG. 17D, a film formed of polyethylene terephthalate (PET), polycarbonate (PC), polyethersulfone (PES), polyimide (PI), polymethylmethacrylate (PMMA), a cyclo-olefin polymer (COP), or the like is coated on the second sensing electrodes 1750, thereby forming a second flexible substrate 1760.

Figure 17E:
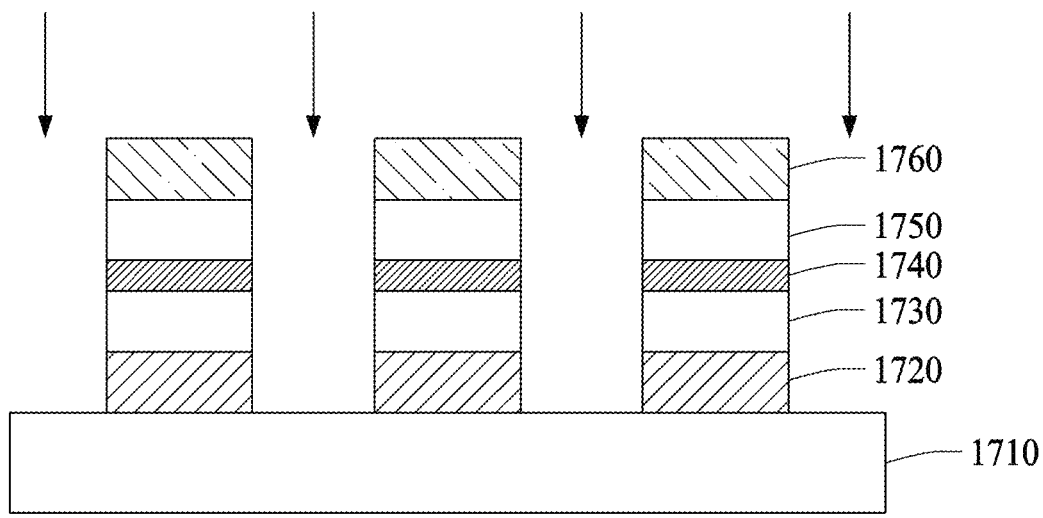

Subsequently, as shown in FIG. 17E, the first flexible substrate 1720 and the second flexible substrate 1760 are subjected to oxygen plasma etching to be patterned in the same shape as the tetragonal mesh structure that is formed by perpendicularly intersecting the first sensing electrodes 1730 with the second sensing electrodes 1750. During the oxygen plasma etching, a photolithography process may be performed using a metal mask so as to form the tetragonal mesh structure.

In addition, the adhesive insulating layer 1740 is also patterned in this process, whereby the adhesive insulating layer 1740 may also have the tetragonal mesh structure.

When the first flexible substrate 1720, the second flexible substrate 1760, and the adhesive insulating layer 1740 are etched at the same time using oxygen plasma as described above, a tetragonal mesh structure may be easily etched and a fabrication process may be simplified, compared to an existing mechanical cutting method.

That is, the first flexible substrate 1720, the second flexible substrate 1760, and the adhesive insulating layer 1740 may be fabricated into a hexagonal mesh structure, wherein hexagonal holes are present between rows and columns, by etching remaining regions except for a region where the first sensing electrodes 1730 and the second sensing electrodes 1750 are located.

Figure 17F:
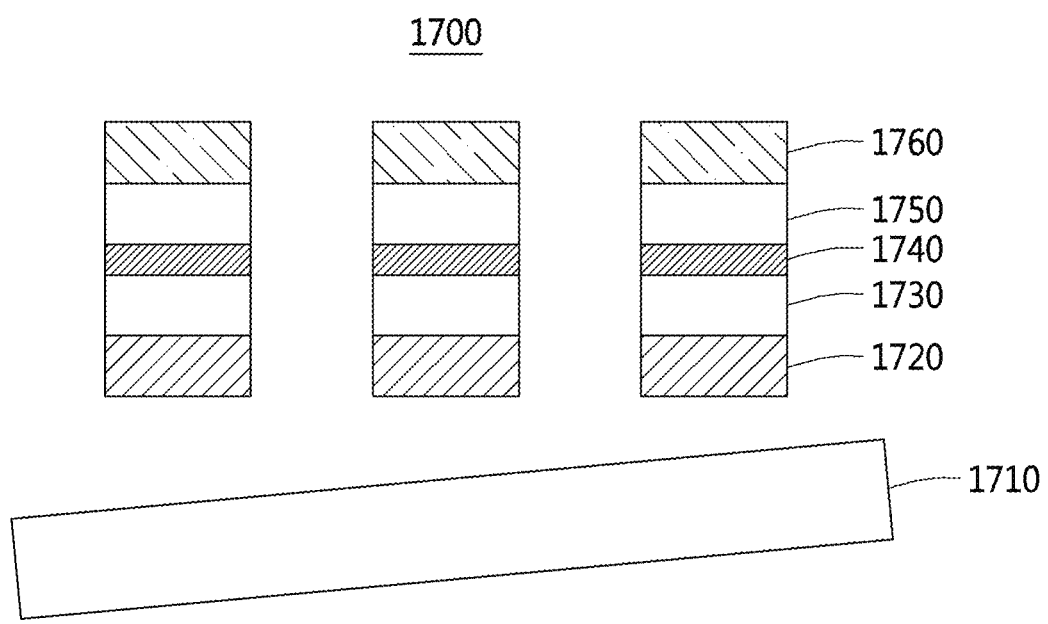

After completing the etching of the first flexible substrate 1720, the second flexible substrate 1760, and the adhesive insulating layer 1740, the metal substrate 1710 is separated using ammonium persulfate (APS) for wet etching as shown in FIG. 17F, thereby fabricating a touch panel 1700.

Figure 17G:
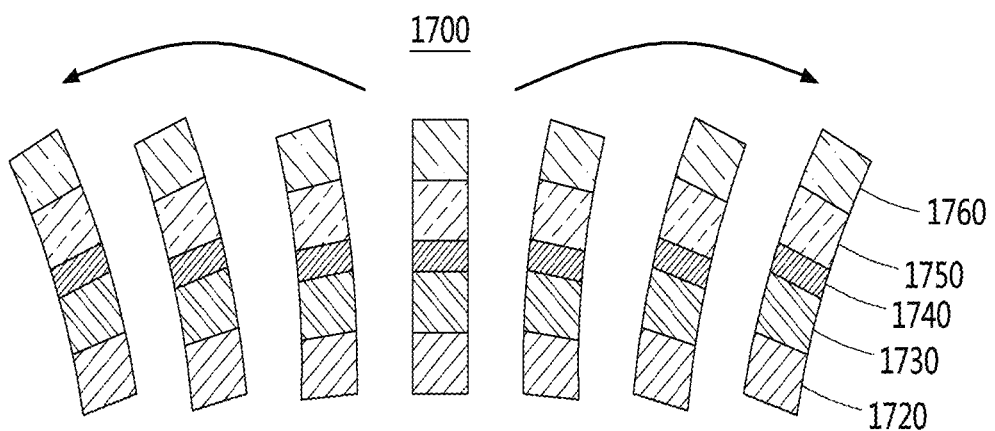

FIG. 17G schematically illustrates bent shapes of the touch panel 1700 fabricated by the method in shown in FIGS. 17A to 17F. The touch panel 1700 is bent in arrow directions when the touch panel 1700 is bent in a state of being held in both directions.

Stretchability of the first and second flexible substrates 1720 and 1760 and "the first and second sensing electrodes 1730 and 1750" increases because deformation due to bending is absorbed by the holes present between the rows and the columns of the tetragonal mesh structure.

Figure 18:
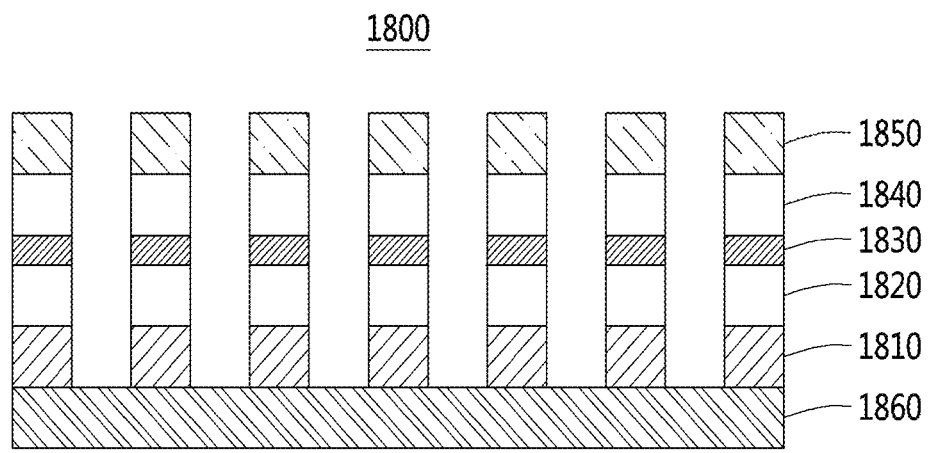
FIG. 18 illustrates a sectional view of a touch panel according to an example of the present disclosure which is applicable to a wearable device.

FIG. 18 illustrates a sectional view of a touch panel according to an example of the present disclosure which is applicable to a wearable device.

FIG. 18 illustrates a sectional view of a touch panel according to an embodiment of the present disclosure which is applicable to a wearable device. A touch panel 1800 includes a first flexible substrate 1810, a plurality of first sensing electrodes 1820, an adhesive insulating layer 1830, a plurality of second sensing electrodes 1840, and a second flexible substrate 1850. A ground shielding layer 1860 formed of graphene, carbon nanotube, a metal wire, a metal mesh, or the like is provided under the first flexible substrate 1810.

The ground shielding layer 1860 may be fabricated in the same manner as shown in FIGS. 17A to 17E, and may be formed before forming the first flexible substrate 1860 on a metal substrate (not shown). That is, the ground shielding layer 1860 and the first flexible substrate 1810 may be formed in this order on the metal substrate.

Alternatively, when the touch panel 1800 is fabricated according to the method shown in FIGS. 17A to 17E, the ground shielding layer 1860 may be formed by transferring an electrode material onto a lower part of the first flexible substrate 1810.

When the touch panel 1800 is applied to a wearable device such as a watch attached to the wrist, interference may occur because it is in contact with or close to the skin.

To prevent this, the ground shielding layer 1860 may be formed on a lower part of the first flexible substrate 1810.

When the touch panel 1800 according to the present disclosure is applied to a wearable device, interference may be shielded, and thus, stable operation may be accomplished. In addition, the touch panel may be easily attached to a curved body due to the flexibility and stretchability thereof.

In accordance with a method of fabricating an ultra-thin touch panel according to the present disclosure, an ultra-thin touch panel having increased flexibility and stretchability may be fabricated by forming sensing electrodes with a substitute for ITO between flexible substrates.

In addition, in accordance with the method of fabricating an ultra-thin touch panel according to the present disclosure, an ultra-thin touch panel having increased flexibility and stretchability may be fabricated by forming a flexible substrate to have a polygonal mesh structure using an oxygen plasma etching method.

In addition, in accordance with the method of fabricating an ultra-thin touch panel according to the present disclosure, an ultra-thin touch panel having a 1-glass type mesh structure may be fabricated by forming all first and second sensing electrodes, which constitute a capacitor, on one flexible substrate.

In addition, in accordance with the method of fabricating an ultra-thin touch panel according to the present disclosure, a hard property of a display device may be addressed by using an ultra-thin touch panel having a 1-glass type mesh structure.

In addition, in accordance with the method of fabricating an ultra-thin touch panel according to the present disclosure, an ultra-thin touch panel may be fabricated into an ultra-thin structure having a thickness of 35 μm or less, thereby having a maximized sensitivity to an object on a touch sensor.

Further, in accordance with the method of fabricating an ultra-thin touch panel according to the present disclosure, an ultra-thin touch panel may be fabricated to react in a non-contact touch manner, thereby being capable of obtaining surface information of a conductive object.

In the aforementioned embodiments, constituents of the present disclosure were expressed in a singular or plural form depending upon embodiments thereof.

However, the singular or plural expressions should be understood to be suitably selected depending upon a suggested situation for convenience of description, and the aforementioned embodiments should be understood not to be limited to the disclosed singular or plural forms. In other words, it should be understood that plural constituents may be a singular constituent or a singular constituent may be plural constituents.

While the embodiments of the present disclosure have been described, those skilled in the art will appreciate that many modifications and changes can be made to the present disclosure without departing from the spirit and essential characteristics of the present disclosure.

Therefore, it should be understood that there is no intent to limit the disclosure to the embodiments disclosed, rather, the disclosure is to cover all modifications, equivalents, and alternatives falling within the spirit and scope of the disclosure as defined by the claims.

DESCRIPTION OF SYMBOLS

100: Ultra-thin touch panel
1000: Flexible display device
110: Flexible substrate
120: Plurality of first sensing electrodes
130: Plurality of second sensing electrodes
200: Metal substrate
210: Flexible substrate
220: Plurality of first sensing electrodes
230: Adhesive insulating layer
240: Plurality of second sensing electrodes
300: Metal substrate
310: Flexible substrate
320: Plurality of first sensing electrodes
330: Adhesive insulating layer 340: Plurality of second sensing electrodes
350: Metal bridge layer

What is claimed is:

1. An ultra-thin touch panel, comprising:
a flexible substrate having a polygonal mesh structure;
a plurality of first sensing electrodes arranged in a first direction on the flexible substrate;
an adhesive insulating layer formed on the flexible substrate and the first sensing electrodes and including a shielding layer for the plurality of first sensing electrodes; and
a plurality of second sensing electrodes arranged in a second direction, which intersects the first direction, and formed on the flexible substrate and the adhesive insulating layer using a wet transfer method,
wherein the flexible substrate is patterned in a shape corresponding to the first and second sensing electrodes by oxygen plasma etching to form the polygonal mesh structure,
wherein the polygonal mesh structure of the flexible substrate includes rows and columns and concave polygonal holes formed between the rows and the columns,
wherein the flexible substrate, the first sensing electrodes and the second sensing electrodes absorb deformation due to a bending of the ultra-thin touch panel based on the concave polygonal holes between the rows and the columns of the polygonal mesh structure,
wherein the polygonal mesh structure is one of a tetragonal mesh structure, a hexagonal mesh structure, and an auxetic mesh structure, and
wherein the shielding layer for the plurality of first sensing electrodes physically separates the plurality of first sensing electrodes from the plurality of second sensing electrodes and electrically connects the plurality of first sensing electrodes to the plurality of second sensing electrodes.

2. The ultra-thin touch panel according to claim 1, wherein the first sensing electrodes are formed to have a concave and convex pattern inclined in a forward or reverse direction and the second sensing electrodes are formed in a zigzag pattern of passing the concave and convex pattern of the first sensing electrodes to form the hexagonal mesh structure or the auxetic mesh structure along with the first sensing electrodes.

3. The ultra-thin touch panel according to claim 1, wherein the first and second sensing electrodes are formed of any one of graphene, a carbon nanotube, a metal wire, and a metal mesh.

4. The ultra-thin touch panel according to claim 1, wherein the flexible substrate is formed of any one of polyethylene terephthalate (PET), polycarbonate (PC), polyethersulfone (PES), polyimide (PI), polymethylmethacrylate (PMMA), and a cyclo-olefin polymer (COP).

5. The ultra-thin touch panel according to claim 1, wherein the adhesive insulating layer is located between the first sensing electrodes and the second sensing electrodes and has a mesh structure the same as the polygonal mesh structure of the flexible substrate.

6. The ultra-thin touch panel according to claim 1, wherein the adhesive insulating layer is formed of any one of an optically clean resin (OCR), an optically clean adhesive (OCA), and SU-8.

7. The ultra-thin touch panel according to claim 1, further comprising a ground shielding layer formed on a lower surface of the flexible substrate and formed of any one of graphene, a carbon nanotube, a metal wire, and a metal mesh.

8. An ultra-thin touch panel, comprising:
a flexible substrate having a polygonal mesh structure;
a plurality of first sensing electrodes arranged in a first direction on the flexible substrate;
an adhesive insulating layer formed on the flexible substrate and the first sensing electrodes;
a plurality of second sensing electrodes arranged in a second direction, which intersects the first direction, and formed on the flexible substrate; and
a metal bridge layer formed on the flexible substrate, the adhesive insulating layer, and the second sensing electrodes, the metal bridge layer contacting the flexible substrate, the adhesive insulating layer, and the second sensing electrodes,
wherein the flexible substrate is patterned in a shape corresponding to the first and second sensing electrodes by oxygen plasma etching to form the polygonal mesh structure,
wherein the polygonal mesh structure of the flexible substrate includes rows and columns and concave polygonal holes formed between the rows and the columns,
wherein the flexible substrate, the first sensing electrodes and the second sensing electrodes absorb deformation due to a bending of the ultra-thin touch panel based on the concave polygonal holes between the rows and the columns of the polygonal mesh structure,
wherein the polygonal mesh structure is one of a tetragonal mesh structure, a hexagonal mesh structure, and an auxetic mesh structure, and
wherein the metal bridge layer physically separates the plurality of first sensing electrodes and the adhesive insulating layer from the plurality of second sensing electrodes and electrically connects the plurality of first sensing electrodes and the adhesive insulating layer to the plurality of second sensing electrodes.

9. The ultra-thin touch panel according to claim 8, wherein the first sensing electrodes are formed to have a concave and convex pattern inclined in a forward or reverse direction and the second sensing electrodes are formed in a zigzag pattern of passing the concave and convex pattern of the first sensing electrodes to form the hexagonal mesh structure or the auxetic mesh structure along with the first sensing electrodes.

10. A method of fabricating an ultra-thin touch panel, the method comprising:
forming a flexible substrate on a metal substrate;
forming a plurality of first sensing electrodes, which is arranged in a first direction, on the flexible substrate;
forming an adhesive insulating layer on the flexible substrate and the first sensing electrodes;
forming a plurality of second sensing electrodes arranged in a second direction, which intersects the first direction, on the flexible substrate and the adhesive insulating layer using a wet transfer method; and
oxygen-plasma-etching the flexible substrate to be patterned into a polygonal mesh structure corresponding to the first sensing electrodes and the second sensing electrodes by oxygen plasma etching,
wherein the polygonal mesh structure of the flexible substrate includes rows and columns and concave polygonal holes formed between the rows and the columns, wherein the flexible substrate, the first sensing electrodes and the second sensing electrodes absorb deformation due to a bending of the ultra-thin touch panel based on the concave polygonal holes between the rows and the columns of the polygonal mesh structure, wherein the polygonal mesh structure is one of a tetragonal mesh structure, a hexagonal mesh structure, and an auxetic mesh structure, wherein the adhesive insulating layer includes a shielding layer for the plurality of first sensing electrodes, and wherein the shielding layer for the plurality of first sensing electrodes physically separates the plurality of first sensing electrodes from the plurality of second sensing electrodes and electrically connects the plurality of first sensing electrodes to the plurality of second sensing electrodes.

11. The method according to claim 10, wherein the forming of the second sensing electrodes comprises patterning the second sensing electrodes in the second direction after wet-transferring the second sensing electrodes onto the adhesive insulating layer.

12. A method of fabricating an ultra-thin touch panel, the method comprising:

forming a flexible substrate on a metal substrate;

forming a plurality of first sensing electrodes, which is arranged in a first direction, on the flexible substrate;

forming an adhesive insulating layer on the flexible substrate and the first sensing electrodes;

forming a plurality of second sensing electrodes in a second direction, which interests the first direction, on the flexible substrate to be spaced from the adhesive insulating layer;

forming a metal bridge layer on the flexible substrate, the adhesive insulating layer, and the second sensing electrodes, the metal bridge layer contacting the flexible substrate, the adhesive insulating layer, and the second sensing electrodes; and oxygen-plasma-etching the flexible substrate to be patterned into a polygonal mesh structure corresponding to the first sensing electrodes and the second sensing electrodes by oxygen plasma etching, wherein the polygonal mesh structure of the flexible substrate includes rows and columns and concave polygonal holes formed between the rows and the columns, wherein the flexible substrate, the first sensing electrodes and the second sensing electrodes absorb deformation due to a bending of the ultra-thin touch panel based on the concave polygonal holes between the rows and the columns of the polygonal mesh structure, wherein the polygonal mesh structure is one of a tetragonal mesh structure, a hexagonal mesh structure, and an auxetic mesh structure, and wherein the metal bridge layer physically separates the plurality of first sensing electrodes and the adhesive insulating layer from the plurality of second sensing electrodes and electrically connects the plurality of first sensing electrodes and the adhesive insulating layer to the plurality of second sensing electrodes.

* * * * *